United States Patent
Fukui et al.

(10) Patent No.: US 12,355,482 B2
(45) Date of Patent: Jul. 8, 2025

(54) TERMINAL APPARATUS, BASE STATION APPARATUS, AND COMMUNICATION METHOD

(71) Applicant: Sharp Kabushiki Kaisha, Sakai (JP)

(72) Inventors: Takahisa Fukui, Sakai (JP); Tomoki Yoshimura, Sakai (JP); Shoichi Suzuki, Sakai (JP); Toshizo Nogami, Sakai (JP); Daiichiro Nakashima, Sakai (JP); Wataru Ouchi, Sakai (JP); Huifa Lin, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 41 days.

(21) Appl. No.: 18/285,887

(22) PCT Filed: Mar. 18, 2022

(86) PCT No.: PCT/JP2022/012612
§ 371 (c)(1),
(2) Date: Oct. 6, 2023

(87) PCT Pub. No.: WO2022/215496
PCT Pub. Date: Oct. 13, 2022

(65) Prior Publication Data
US 2024/0187035 A1    Jun. 6, 2024

(30) Foreign Application Priority Data
Apr. 9, 2021   (JP) .................................. 2021-066378

(51) Int. Cl.
*H04B 1/69*    (2011.01)
*H04L 1/08*    (2006.01)
(Continued)

(52) U.S. Cl.
CPC ................. *H04B 1/69* (2013.01); *H04L 1/08* (2013.01); *H04L 5/0012* (2013.01);
(Continued)

(58) Field of Classification Search
CPC ........... H04B 1/69; H04L 1/08; H04L 5/0012; H04L 5/0053; H04W 72/0446
See application file for complete search history.

(56) References Cited

U.S. PATENT DOCUMENTS

| | | | | |
|---|---|---|---|---|
| 2015/0146670 A1* | 5/2015 | Liu | ....................... | H04L 5/0007 370/329 |
| 2016/0020891 A1* | 1/2016 | Jung | ..................... | H04L 5/0064 370/280 |

(Continued)

FOREIGN PATENT DOCUMENTS

| | | |
|---|---|---|
| EP | 4016910 A1 | 6/2022 |
| WO | 2021054726 A1 | 3/2021 |

OTHER PUBLICATIONS

Official Communication issued in International Patent Application No. PCT/JP2022/012612, mailed on May 24, 2022.
(Continued)

*Primary Examiner* — Khanh C Tran
(74) *Attorney, Agent, or Firm* — Keating & Bennett, LLP

(57) ABSTRACT

A terminal apparatus includes a receiver configured to receive a PDCCH including a DCI format indicating transmission of a PUCCH, and a transmitter configured to transmit the PUCCH. The number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern is determined based on the DCI format, and whether repetition of the PUCCH in each of the $N^{repeat}_{PUCCH}$ slots is allocated at least in the first
(Continued)

PRB or at least in the second PRB is determined based on the one hopping pattern.

3 Claims, 13 Drawing Sheets

(51) Int. Cl.
*H04L 5/00* (2006.01)
*H04W 72/0446* (2023.01)

(52) U.S. Cl.
CPC ....... *H04L 5/0053* (2013.01); *H04W 72/0446* (2013.01); *H04B 2001/6908* (2013.01)

(56) References Cited

U.S. PATENT DOCUMENTS

| | | | |
|---|---|---|---|
| 2018/0199335 A1* | 7/2018 | Jung | H04W 72/21 |
| 2020/0154467 A1 | 5/2020 | Gong et al. | |
| 2020/0229104 A1* | 7/2020 | MolavianJazi | H04W 52/42 |
| 2021/0058111 A1 | 2/2021 | Liu et al. | |
| 2022/0353698 A1 | 11/2022 | Jang et al. | |
| 2024/0163034 A1* | 5/2024 | Seok | H04L 5/0012 |

OTHER PUBLICATIONS

NTT Docomo, "New SID Proposal: Study on New Radio Access Technology", 3GPP TSG RAN Meeting #71, RP-160671, Mar. 7-10, 2016, 8 pages.
RAN chairman et al., "Release 17 package for RAN", 3GPP TSG RAN Meeting #86, RP-193216, Dec. 9-12, 2019, 23 pages.

* cited by examiner

Figure 2A: Number of OFDM symbols per slot, slots per frame, and slots per subframe for normal cyclic prefix

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B: Number of OFDM symbols per slot, slots per frame, and slots per subframe for extended cyclic prefix

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

| Case | Slot 931 | Slot 932 | Slot 933 | Slot 934 |
|---|---|---|---|---|
| 1 | Slot set #1-1 | | | |
| 2 | | Slot set #2-1 | | Slot set #2-2 |
| 3 | Slot set #3-1 | | Slot set #3-2 | |
| 4 | Slot set #4-1 | | Slot set #4-2 | Slot set #4-3 |
| 5 | Slot set #5-1 | | Slot set #5-2 | |
| 6 | Slot set #6-1 | Slot set #6-2 | | Slot set #6-3 |
| 7 | Slot set #7-1 | Slot set #7-2 | | Slot set #7-3 |
| 8 | Slot set #8-1 | Slot set #8-2 | Slot set #8-3 | Slot set #8-4 |

FIG. 10

| Hopping patterns | Slot931 PUCCH920 | Slot932 PUCCH921 | Slot933 PUCCH922 | Slot934 PUCCH923 |
|---|---|---|---|---|
| 1 | First PRB | First PRB | First PRB | First PRB |
| 2 | First PRB | First PRB | First PRB | Second PRB |
| 3 | First PRB | First PRB | Second PRB | First PRB |
| 4 | First PRB | Second PRB | Second PRB | Second PRB |
| 5 | First PRB | Second PRB | First PRB | First PRB |
| 6 | First PRB | Second PRB | First PRB | Second PRB |
| 7 | First PRB | Second PRB | Second PRB | First PRB |
| 8 | First PRB | Second PRB | Second PRB | Second PRB |
| 9 | Second PRB | First PRB | First PRB | First PRB |
| 10 | Second PRB | First PRB | First PRB | Second PRB |
| 11 | Second PRB | First PRB | Second PRB | First PRB |
| 12 | Second PRB | First PRB | Second PRB | Second PRB |
| 13 | Second PRB | Second PRB | First PRB | First PRB |
| 14 | Second PRB | Second PRB | First PRB | Second PRB |
| 15 | Second PRB | Second PRB | Second PRB | First PRB |
| 16 | Second PRB | Second PRB | Second PRB | Second PRB |

FIG. 11

Figure A: Hopping patterns of Scheme 7 when number of PUCCH repetitions is 4.

| Hopping patterns | Slot#1 PUCCH#1 | Slot#2 PUCCH#2 | Slot#3 PUCCH#3 | Slot#4 PUCCH#4 |
|---|---|---|---|---|
| 1 | First PRB | First PRB | Second PRB | Second PRB |
| 2 | First PRB | Second PRB | Second PRB | First PRB |

Figure B: Hopping patterns of Scheme 7 when number of PUCCH repetitions is 8.

| Hopping patterns | Slot#1 PUCCH#1 | Slot#2 PUCCH#2 | Slot#3 PUCCH#3 | Slot#4 PUCCH#4 | Slot#5 PUCCH#5 | Slot#6 PUCCH#6 | Slot#7 PUCCH#7 | Slot#8 PUCCH#8 |
|---|---|---|---|---|---|---|---|---|
| 1 | First PRB | First PRB | First PRB | First PRB | Second PRB | Second PRB | Second PRB | Second PRB |
| 2 | First PRB | First PRB | Second PRB | Second PRB | Second PRB | Second PRB | First PRB | First PRB |
| 3 | First PRB | Second PRB | Second PRB | Second PRB | Second PRB | First PRB | First PRB | First PRB |
| 4 | First PRB | Second PRB | Second PRB | First PRB | First PRB | First PRB | First PRB | Second PRB |

FIG. 12

Figure A: Hopping patterns of Scheme 8 when number of PUCCH repetitions is 4.

| Hopping patterns | Slot set#1 PUCCH#1 | Slot set#2 PUCCH#2 | Slot set#3 PUCCH#3 | Slot set#4 PUCCH#4 |
|---|---|---|---|---|
| 1 | First PRB | Second PRB | First PRB | Second PRB |

Figure B: Hopping patterns of Scheme 8 when number of PUCCH repetitions is 8.

| Hopping patterns | Slot set#1 PUCCH#1 | Slot set#2 PUCCH#2 | Slot set#3 PUCCH#3 | Slot set#4 PUCCH# | Slot set#5 PUCCH#5 | Slot set#6 PUCCH#6 | Slot set#7 PUCCH#7 | Slot set#8 PUCCH#8 |
|---|---|---|---|---|---|---|---|---|
| 1 | First PRB | Second PRB | First PRB | Second PRB | First PRB | Second PRB | First PRB | Second PRB |
| 2 | First PRB | First PRB | Second PRB | Second PRB | First PRB | First PRB | Second PRB | Second PRB |
| 3 | First PRB | First PRB | First PRB | Second PRB | Second PRB | Second PRB | First PRB | First PRB |

FIG. 13

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2021-66378 filed on Apr. 9, 2021, the contents of which are incorporated herein by reference.

BACKGROUND ART

In the $3^{rd}$ Generation Partnership Project (3GPP), a radio access method and a radio network for cellular mobile communications (hereinafter also referred to as "Long Term Evolution (LTE)" or "Evolved Universal Terrestrial Radio Access (EUTRA)") have been studied. In LTE, a base station apparatus is also referred to as an evolved NodeB (eNodeB) and a terminal apparatus is also referred to as a User Equipment (UE). LTE is a cellular communication system in which multiple areas covered by base station apparatuses are arranged in a form of cells. A single base station apparatus may manage multiple serving cells.

The 3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is to be satisfy requirements for three scenarios including enhanced Mobile BroadBand (eMBB), massive Machine Type Communication (mMTC), and Ultra Reliable and Low Latency Communication (URLLC) in a single technology framework.

In the 3GPP, extension of services supported by NR has been studied (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.
NPL 2: "Release 17 package for RAN", RP-193216, RAN chairman, RAN1 chairman, RAN2 chairman, RAN3 chairman, 3GPP TSG RAN Meeting #86, Sitges, Spain, 9-12 Dec. 2019

SUMMARY OF INVENTION

Technical Problem

The present invention provides a terminal apparatus that efficiently performs communication, a communication method used for the terminal apparatus, a base station apparatus that efficiently performs communication, and a communication method used for the base station apparatus.

Solution to Problem (1) A first aspect of the present invention is a terminal apparatus including a receiver configured to receive a PDCCH including a DCI format indicating transmission of a PUCCH, and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern from multiple hopping patterns is determined based on the DCI format, and whether repetition of the PUCCH in each of the $N^{repeat}_{PUCCH}$ slots is allocated at least in the first PRB or at least in the second PRB is determined based on the one hopping pattern.

(2) A second aspect of the present invention is a base station apparatus including a transmitter configured to transmit a PDCCH including a DCI format indicating transmission of a PUCCH, and a receiver configured to receive the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern from multiple hopping patterns is determined based on the DCI format, and whether repetition of the PUCCH in each of the $N^{repeat}_{PUCCH}$ slots is allocated at least in the first PRB or at least in the second PRB is determined based on the one hopping pattern.

(3) A third aspect of the present invention is a communication method used in a terminal apparatus, the communication method including receiving a PDCCH including a DCI format indicating transmission of a PUCCH, and transmitting the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern from multiple hopping patterns is determined based on the DCI format, and whether repetition of the PUCCH in each of the $N^{repeat}_{PUCCH}$ slots is allocated at least in the first PRB or at least in the second PRB is determined based on the one hopping pattern.

(4) A fourth aspect of the present invention is a communication method used in a base station apparatus, the communication method including transmitting a PDCCH including a DCI format indicating transmission of a PUCCH, and receiving the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern from multiple hopping patterns is determined based on the DCI format, and whether repetition of the PUCCH in each of the $N^{repeat}_{PUCCH}$ slots is allocated at least in the first PRB or at least in the second PRB is determined based on the one hopping pattern.

Advantageous Effects of Invention

According to the present invention, the terminal apparatus can efficiently perform communication. The base station apparatus can efficiently perform communication.

BRIEF DESCRIPTION OF DRAWINGS

FIG. 2 is an example illustrating a relationship between the subcarrier spacing configuration μ, the number of OFDM symbols per slot $N^{slot}_{symb}$, and a cyclic Prefix (CP) configuration according to an aspect of the present embodiment.

FIG. 10 is a diagram illustrating a relationship among slots in FIG. 9 according to an aspect of the present embodiment.

FIG. 11 is a diagram illustrating an example of PRB allocation to repeated transmissions of PUCCH in FIG. 9 according to an aspect of the present embodiment.

FIG. 12 is a diagram illustrating multiple hopping patterns in means 7 according to an aspect of the present embodiment.

FIG. 13 is a diagram illustrating multiple hopping patterns in means 8 according to an aspect of the present embodiment.

DESCRIPTION OF EMBODIMENTS

An embodiment of the present invention will be described below.

floor(C) may be a floor function for a real number C. For example, floor(C) may be a function that outputs a maximum integer in a range of not exceeding the real number C. ceil(D) may be a ceiling function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I. max(J, K) is a function that outputs a maximum value out of J and K. Here, in a case that J and K are equal, max(J, K) is a function that outputs J or K. min(L, M) is a function that outputs a maximum value out of L and M. Here, in a case that L and M are equal, min(L, M) is a function that outputs L or M. round(N) is a function that outputs an integer value of a value closest to N.

In the radio communication system according to an aspect of the present embodiment, at least Orthogonal Frequency Division Multiplex (OFDM) is used. The OFDM symbol is a time domain unit of the OFDM. The OFDM symbol includes at least one or multiple subcarriers. The OFDM symbol is converted into a time-continuous signal in baseband signal generation. In a downlink, at least Cyclic Prefix-Orthogonal Frequency Division Multiplex (CP-OFDM) is used. In an uplink, either CP-OFDM or Discrete FourierTransform-spread-Orthogonal Frequency Division Multiplex (DFT-s-OFDM) is used. DFT-s-OFDM may be given by applying Transform preceding to the CP-OFDM.

The OFDM symbol may be a term including a CP added to the OFDM symbol. That is, a certain OFDM symbol may include the certain OFDM symbol and the CP added to the certain OFDM symbol.

Figure 1:
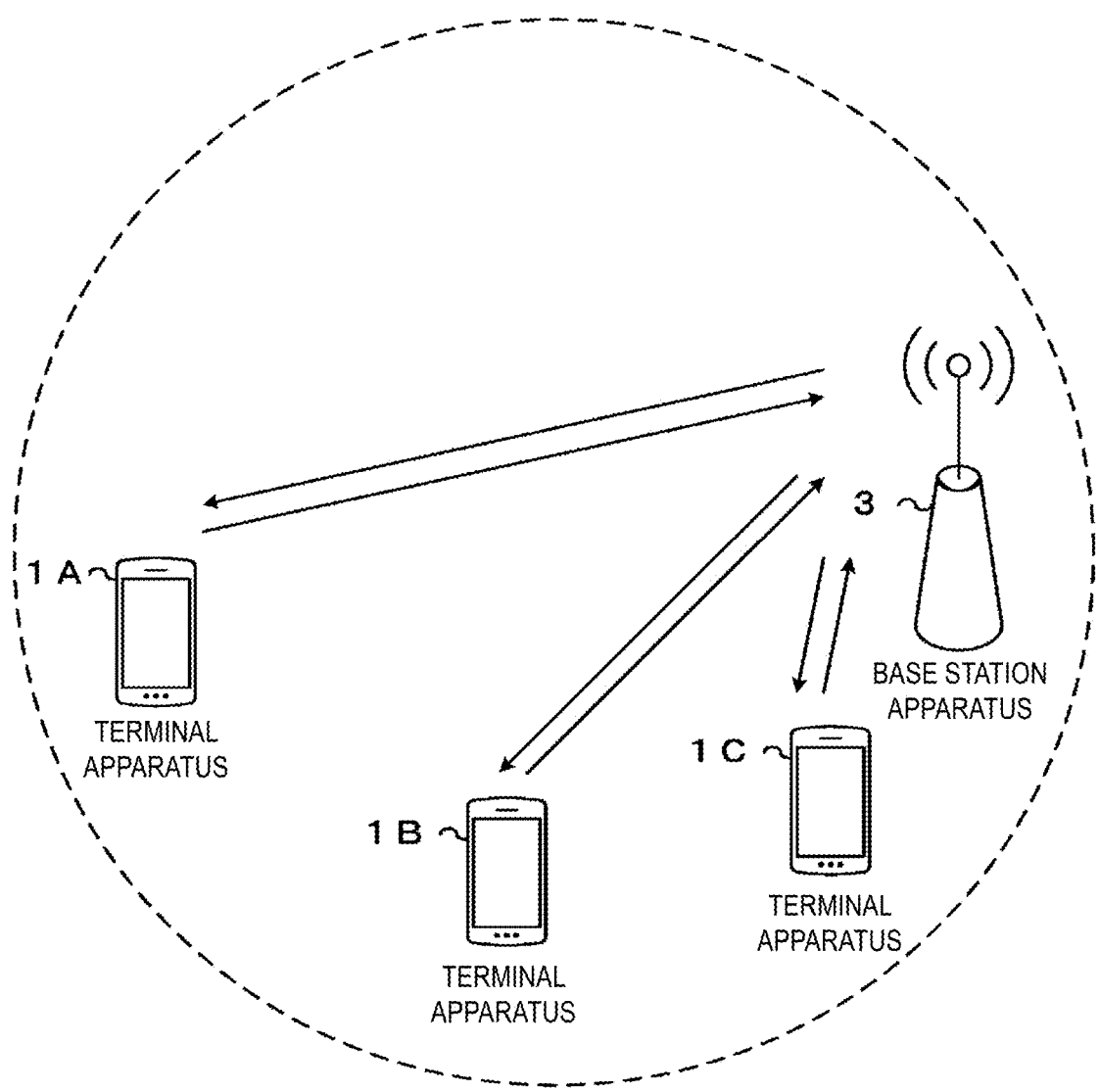
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes at least terminal apparatuses 1A to 1C and a base station apparatus 3 (Base station #3 (BS #3)). Hereinafter, the terminal apparatuses 1A to 1C are also referred to as a terminal apparatus 1 (UserEquipment #1 (UE #1)).

The base station apparatus 3 may include one or multiple transmission apparatuses (or transmission points, transmission and/or reception apparatuses, transmission and/or reception points). In a case that the base station apparatus 3 includes multiple transmission apparatuses, the multiple transmission apparatuses may be arranged at different positions.

The base station apparatus 3 may provide one or multiple serving cells. Each serving cell may be defined as a set of resources used for radio communication. The serving cell is also referred to as a cell.

The serving cell may include at least one downlink component carrier (downlink carrier) and/or one uplink component carrier (uplink carrier). The serving cell may include at least two or more downlink component carriers, and/or two or more uplink component carriers. The downlink component carrier and the uplink component carrier are also referred to as a component carrier (carrier).

For example, for one component carrier, one resource grid may be given. For one component carrier and a certain subcarrier spacing configuration μ, one resource grid may be given. Here, the subcarrier spacing configuration μ is also referred to as numerology. The resource grid includes $N^{size,\,\mu}_{grid,\,x} N^{RB}_{sc}$ subcarriers. The resource grid starts from a common resource block $N^{start,\,\mu}_{grid,\,x}$. The common resource block $N^{start,\,\mu}_{grid,\,x}$ is also referred to as a reference point of the resource grid. The resource grid includes $N^{subframe,\,\mu}_{symb}$ OFDM symbols. x is a subscript indicating a transmission direction and indicates either of a downlink or an uplink. For a set of a certain antenna port p, a certain subcarrier spacing configuration μ, and a certain transmission direction x, one resource grid is given.

$N^{size,\,\mu}_{grid,\,x}$ and $N^{start,\,\mu}_{grid,\,x}$ are given based at least on a higher layer parameter (CarrierBandwidth). The higher layer parameter is also referred to as an SCS specific carrier. One resource grid corresponds to one SCS specific carrier. One component carrier may include one or multiple SCS specific carriers. The SCS specific carrier may be included in system information. For each of the SCS specific carriers, one subcarrier spacing configuration may be given.

The SubCarrier Spacing (SCS) Δf may be Δf=$2^\mu \cdot 15$ kHz. For example, the subcarrier spacing configuration μ may indicate one of 0, 1, 2, 3, or 4.

FIG. 2 is an example illustrating a relationship between the subcarrier spacing configuration μ, the number of OFDM symbols per slot $N^{slot}_{symb}$, and a cyclic Prefix (CP) configuration according to an aspect of the present embodiment. In FIG. 2A, for example, in a case that the subcarrier spacing configuration μ is two and the CP configuration is a normal cyclic prefix (normal CP), $N^{slot}_{symb}$=14, $N^{frame,\mu}_{slot}$=40, and $N^{subframe,\,\mu}_{slot}$=4. In FIG. 2B, for example, in a case that the subcarrier spacing configuration is two and the CP configuration is an extended cyclic prefix (extended CP), $N^{slot}_{symb}=12$, $N^{frame,\mu}_{slot}=40$, and $N^{subframe, \mu}_{slot}=4$.

In the radio communication system according to an aspect of the present embodiment, time unit $T_c$ may be used for expression of the length of the time domain. The time unit $T_c$ is $T_c=1/(\Delta f_{max} \cdot N_f)$. $\Delta f_{max}=480$ kHz. $N_f=4096$. A constant $\kappa$ is $\kappa=\Delta f_{max} \cdot N_f/(\Delta f_{ref} N_{f, ref})=64$. $\Delta f_{ref}$ is 15 kHz. $N_{f, ref}$ is 2048.

Transmission of a signal in the downlink and/or transmission of a signal in the uplink may be organized into a radio frame (system frame, frame) having the length $T_f$. $T_f=(\Delta f_{max} N_f/100) \cdot T_s=10$ ms. "·" represents multiplication. The radio frame includes 10 subframes. The length $T_{sf}$ of the subframe is $(\Delta f_{max} N_f/1000) \cdot T_s=1$ ms. The number of OFDM symbols per subframe is $N^{subframe, \mu}_{symb}=N^{slot}_{symb} N^{subframe, \mu}_{slot}$.

For a certain subcarrier spacing configuration $\mu$, the number and indices of slots included in the subframe may be given. For example, slot indices $n^\mu_s$ may be given in ascending order in the subframe with integer values within a range of 0 to $N^{subframe, \mu}_{slot}-1$. For the subcarrier spacing configuration $\mu$, the number and indices of slots included in the radio frame may be given. Slot indices $n^\mu_{s, f}$ may be given in ascending order in the radio frame with integer values within a range of 0 to $N^{frame, \mu}_{slot}-1$. $N^{slot}_{symb}$ consecutive OFDM symbols may be included in one slot. $N^{slot}_{symb}$ is 14.

Figure 3:
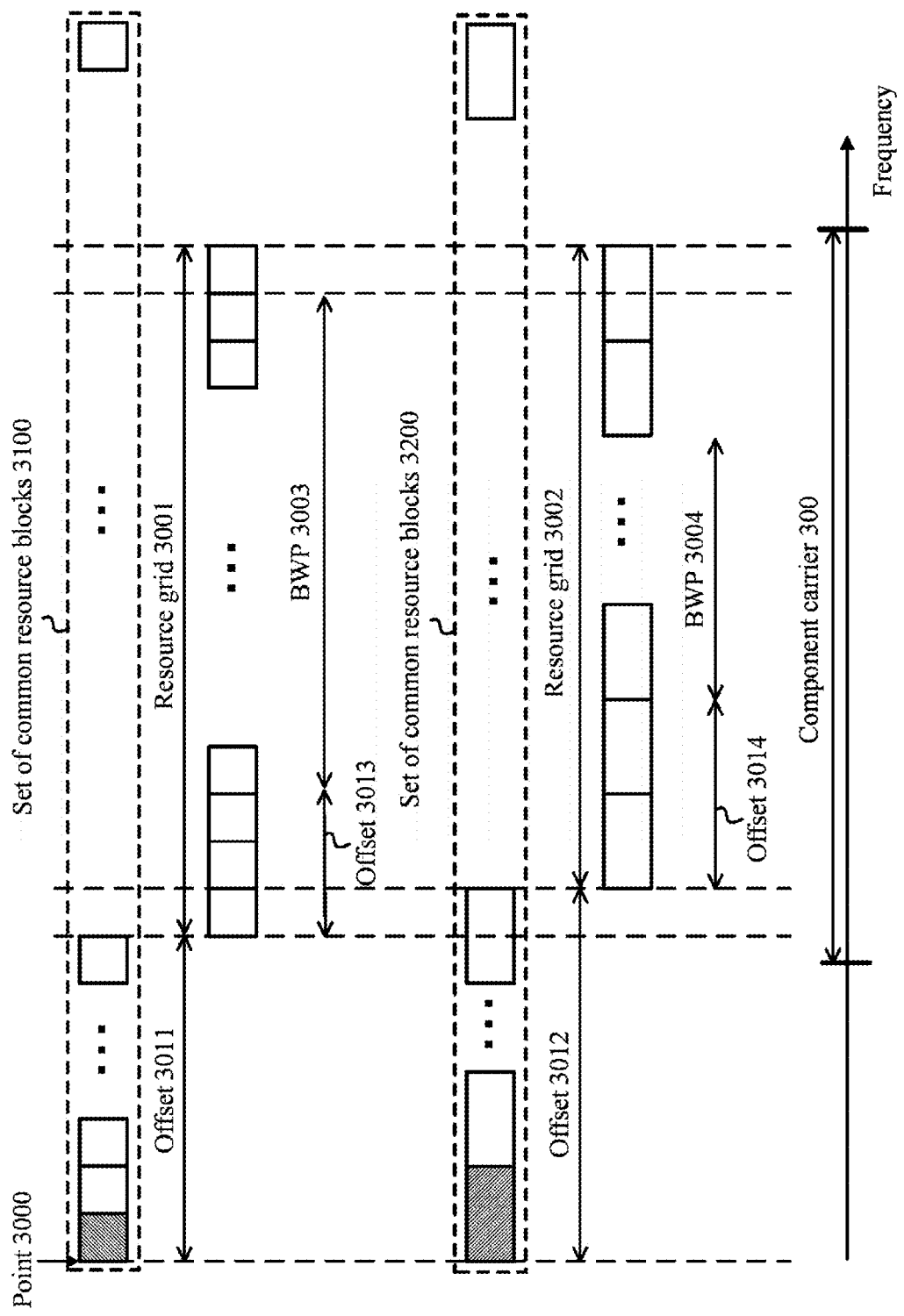
FIG. 3 is a diagram illustrating an example of a configuration method of a resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing $\mu_1$ in a component carrier 300, and a configuration example of a resource grid of a subcarrier spacing $\mu_2$ in the certain component carrier. As described above, for a certain component carrier, one or multiple subcarrier spacings may be configured. In FIG. 3, it is assumed that $\mu_1=\mu_2-1$, but various aspects of the present embodiment are not limited to the condition of $\mu_1=\mu_2-1$.

The component carrier 300 is a band having a predetermined width in the frequency domain.

A Point 3000 is an identifier for identifying a certain subcarrier. The point 3000 is also referred to as a point A. A Common resource block (CRB) set 3100 is a set of common resource blocks for the subcarrier spacing configuration $\mu_1$.

In the common resource block set 3100, a common resource block (block hatched with lines rising diagonally up and to the right in FIG. 3) including the point 3000 is also referred to as a reference point of the common resource block set 3100. The reference point of the common resource block set 3100 may be a common resource block having an index of 0 in the common resource block set 3100.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size, \mu}_{grid1, x}$ common resource blocks starting from the reference point of the resource grid 3001.

An offset 3013 is an offset from the reference point of the resource grid 3001 to a reference point ($N^{start, \mu}_{BWP, i1}$) of a Band Width Part (BWP) 3003 having an index of i1.

A common resource block set 3200 is a set of common resource blocks for the subcarrier spacing configuration $\mu_2$.

In the common resource block set 3200, a common resource block (block hatched with lines rising diagonally up and to the left in FIG. 3) including the point 3000 is also referred to as a reference point of the common resource block set 3200. The reference point of the common resource block set 3200 may be a common resource block having an index of 0 in the common resource block set 3200.

An offset 3012 is an offset from the reference point of the common resource block set 3200 to a reference point of a resource grid 3002. The offset 3012 is represented by the number of common resource blocks for the subcarrier spacing $\mu_2$. The resource grid 3002 includes $N^{size, \mu}_{grid2, x}$ common resource blocks starting from the reference point of the resource grid 3002.

An offset 3014 is an offset from the reference point of the resource grid 3002 to a reference point ($N^{start, \mu}_{BWP, i2}$) of a BWP 3004 having an index of i2.

Figure 4:
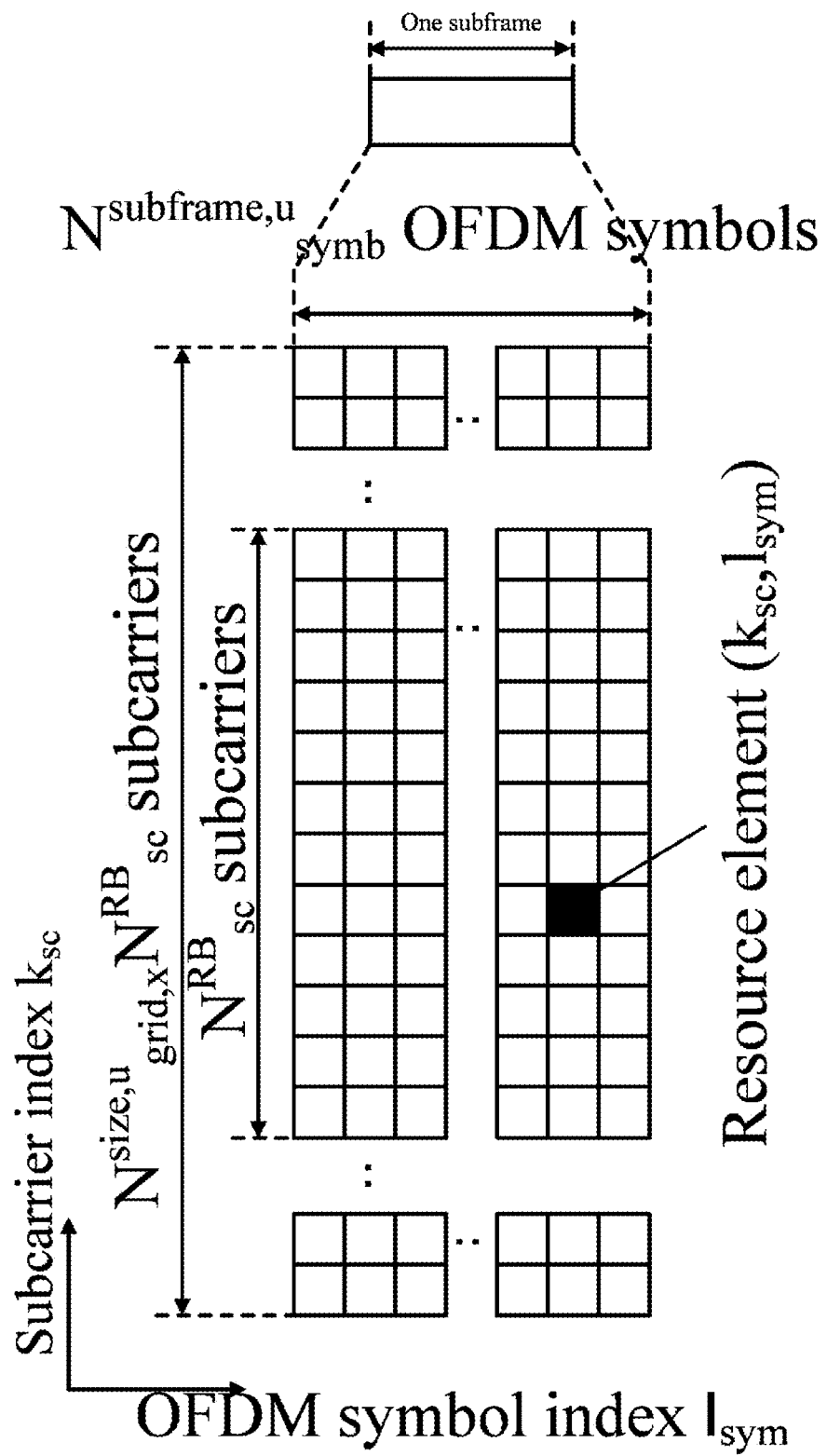
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $l_{sym}$, and the vertical axis corresponds to a subcarrier index $k_{sc}$. The resource grid 3001 includes $N^{size, \mu}_{grid1, x} N^{RB}_{sc}$ subcarriers, and $N^{subframe, \mu}_{symb}$ OFDM symbols. In the resource grid, a resource identified by the subcarrier index $k_{sc}$ and the OFDM symbol index $l_{sym}$ is also referred to as a Resource Element (RE).

The Resource Block (RB) includes $N^{RB}_{sc}$ consecutive subcarriers. The resource block is a general term for a common resource block, a Physical Resource Block (PRB), and a Virtual Resource Block (VRB). Here, $N^{RB}_{sc}$ is 12.

A resource block unit is a set of resources corresponding to one OFDM symbol in one resource block. That is, one resource block unit includes 12 resource elements corresponding to one OFDM symbol in one resource block.

The common resource blocks for a certain subcarrier spacing configuration $\mu$ are assigned indices in ascending order from 0 in the frequency domain in a certain common resource block set (indexing). The common resource block having an index of 0 for a certain subcarrier spacing configuration $\mu$ includes (or collides with, matches) the point 3000. An index $n^\mu_{CRB}$ of the common resource block for a certain subcarrier spacing configuration $\mu$ satisfies a relationship of $n^\mu_{CRB}=\text{ceil}(k_{sc}/N^{RB}_{sc})$. Here, a subcarrier with $k_{sc}=0$ is a subcarrier having the same center frequency as the center frequency of a subcarrier corresponding to the point 3000.

Physical resource blocks for a certain subcarrier spacing configuration $\mu$ are assigned indices in ascending order from 0 in the frequency domain in a certain BWP. An index $n^\mu_{PRB}$ of the physical resource block for a certain subcarrier spacing configuration $\mu$ satisfies a relationship of $n^\mu_{CRB}=n^\mu_{PRB}+N^{start, \mu}_{BWP, i}$. Here, $N^{start, \mu}_{BWP, i}$ indicates a reference point of the BWP having an index of i.

The BWP is defined as a subset of common resource blocks included in the resource grid. The BWP includes $N^{size, \mu}_{BWP, i}$ common resource blocks starting from the reference point $N^{start, \mu}_{BWP, i}$ of the BWP. The BWP configured for the downlink carrier is also referred to as a downlink BWP. The BWP configured for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. The symbol may correspond to an OFDM symbol. The symbol may also correspond to the resource block unit. The symbol may correspond to the resource element.

The fact that a large scale property of a channel over which a symbol on one antenna port is conveyed can be inferred from a channel over which a symbol on another antenna port is conveyed is referred to as the two antenna ports are Quasi Co-Located (QCL). The large scale property may include at least long term performance of a channel. The large scale property may include at least a part or all of delay spread, Doppler spread, Doppler shift, an average gain, an average delay, and a beam parameter (spatial Rx parameters). The fact that the first antenna port and the second antenna port are QCL with respect to a beam parameter may mean that a reception beam assumed by a receiver for the first antenna port and a reception beam assumed by the receiver for the second antenna port are the same. The fact that the first antenna port and the second antenna port are QCL with respect to a beam parameter may mean that a transmission beam assumed by a receiver for the first antenna port and a transmission beam assumed by the receiver for the second antenna port are the same. In a case that the large scale property of a channel over which a symbol on one antenna port is conveyed can be inferred from a channel over which a symbol on another antenna port is conveyed, the terminal apparatus 1 may assume that the two antenna ports are QCL. The fact that two antenna ports are QCL may mean that the two antenna ports are assumed to be QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
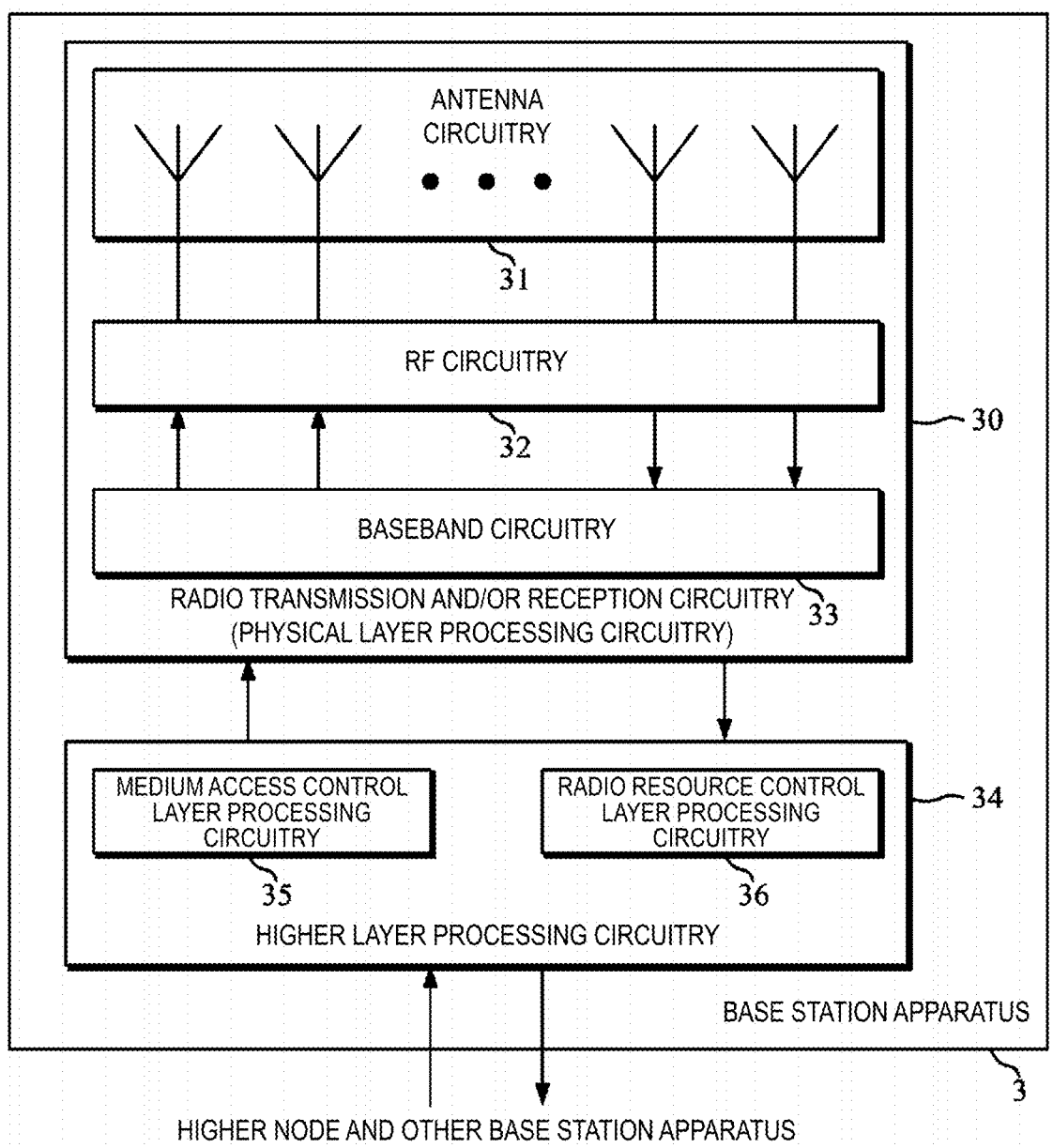
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 includes at least a part or all of a radio transmission and/or reception circuitry (physical layer processing circuitry) 30 and/or a higher layer processing circuitry 34. The radio transmission and/or reception circuitry 30 includes at least a part or all of an antenna circuitry 31, a Radio Frequency (RF) circuitry 32, and a baseband circuitry 33. The higher layer processing circuitry 34 includes at least a part or all of a medium access control layer processing circuitry 35 and a Radio Resource Control (RRC) layer processing circuitry 36.

The radio transmission and/or reception circuitry 30 includes at least a part or all of a radio transmission circuitry 30a and a radio reception circuitry 30b. Here, apparatus configurations of the baseband circuitry included in the radio transmission circuitry 30a and the baseband circuitry included in the radio reception circuitry 30b may be the same or different from each other. Apparatus configurations of the RF circuitry included in the radio transmission circuitry 30a and the RF circuitry included in the radio reception circuitry 30b may be the same or different from each other. Apparatus configurations of the antenna circuitry included in the radio transmission circuitry 30a and the antenna circuitry included in the radio reception circuitry 30b may be the same or different from each other.

For example, the radio transmission circuitry 30a may generate and transmit a baseband signal of the PDSCH. For example, the radio transmission circuitry 30a may generate and transmit a baseband signal of the PDCCH. For example, the radio transmission circuitry 30a may generate and transmit a baseband signal of the PBCH. For example, the radio transmission circuitry 30a may generate and transmit a baseband signal of a synchronization signal. For example, the radio transmission circuitry 30a may generate and transmit a baseband signal of the PDSCH DMRS. For example, the radio transmission circuitry 30a may generate and transmit a baseband signal of the PDCCH DMRS. For example, the radio transmission circuitry 30a may generate and transmit a baseband signal of the CSI-RS. For example, the radio transmission circuitry 30a may generate and transmit a baseband signal of the DL PTRS.

For example, the radio reception circuitry 30b may receive the PRACH. For example, the radio reception circuitry 30b may receive and demodulate the PUCCH. The radio reception circuitry 30b may receive and demodulate the PUSCH. For example, the radio reception circuitry 30b may receive the PUCCH DMRS. For example, the radio reception circuitry 30b may receive the PUSCH DMRS. For example, the radio reception circuitry 30b may receive the UL PTRS. For example, the radio reception circuitry 30b may receive the SRS.

The higher layer processing circuitry 34 outputs downlink data (a transport block) to the radio transmission and/or reception circuitry 30 (or the radio transmission circuitry 30a). The higher layer processing circuitry 34 performs processing operations of a Medium Access Control (MAC) layer, a Packet Data Convergence Protocol (PDCP) layer, a Radio Link Control (RLC) layer, and an RRC layer.

The medium access control layer processing circuitry 35 included in the higher layer processing circuitry 34 performs processing of the MAC layer.

The radio resource control layer processing circuitry 36 included in the higher layer processing circuitry 34 performs processing of the RRC layer. The radio resource control layer processing circuitry 36 manages various pieces of configuration information/parameters (RRC parameters) of the terminal apparatus 1. The radio resource control layer processing circuitry 36 sets the RRC parameter based on an RRC message received from the terminal apparatus 1.

The radio transmission and/or reception circuitry 30 (or the radio transmission circuitry 30a) performs processing such as modulation and coding. The radio transmission and/or reception circuitry 30 (or the radio transmission circuitry 30a) generates a physical signal through modulation, coding, and baseband signal generation (conversion into the time-continuous signal) on the downlink data, and transmits the physical signal to the terminal apparatus 1. The radio transmission and/or reception circuitry 30 (or the radio transmission circuitry 30a) may map the physical signal to a certain component carrier and transmit the physical signal to the terminal apparatus 1.

The radio transmission and/or reception circuitry 30 (or the radio reception circuitry 30b) performs processing such as demodulation and decoding. The radio transmission and/or reception circuitry 30 (or the radio reception circuitry 30b) separates, demodulates, and decodes the received physical signal, and outputs the decoded information to the higher layer processing circuitry 34. The radio transmission and/or reception circuitry 30 (or the radio reception circuitry 30b) may perform a channel access procedure prior to transmission of the physical signal.

The RF circuitry 32 converts (down converts) a signal received via the antenna circuitry 31 into a baseband signal by means of quadrature demodulation and removes unnecessary frequency components. The RF circuitry 32 outputs a processed analog signal to the baseband circuitry.

The baseband circuitry 33 converts an analog signal input from the RF circuitry 32 into a digital signal. The baseband circuitry 33 removes a portion corresponding to a Cyclic Prefix (CP) from the converted digital signal, performs a Fast Fourier Transform (FFT) on the signal from which the CP has been removed, and extracts a signal in the frequency domain.

The baseband circuitry 33 performs Inverse Fast Fourier Transform (IFFT) on the data to generate an OFDM symbol, adds a CP to the generated OFDM symbol, generates a baseband digital signal, and converts the baseband digital signal into an analog signal. The baseband circuitry 33 outputs the converted analog signal to the RF circuitry 32.

The RF circuitry 32 removes an unnecessary frequency component from the analog signal input from the baseband circuitry 33 by using a low-pass filter, up converts the analog signal into a signal having a carrier frequency, and transmits the signal via the antenna circuitry 31. The RF circuitry 32 may have a function of controlling transmission power. The RF circuitry 32 is also referred to as a transmission power control circuitry.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a Reconfiguration with synchronization.

The SCell may be included in either of the MCG or the SCG.

A serving cell group (cell group) is a term at least including an MCG and an SCG. The serving cell group may include one or multiple serving cells (or component carriers). One or multiple serving cells (or component carriers) included in the serving cell group may be operated by means of carrier aggregation.

One or multiple downlink BWPs may be configured for each of the serving cells (or downlink component carriers). One or multiple uplink BWPs may be configured for each of the serving cells (or uplink component carriers).

Among one or multiple downlink BWPs configured for the serving cell (or the downlink component carrier), one downlink BWP may be configured as an active downlink BWP (or one downlink BWP may be activated). Among one or multiple uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP and activating any one of the inactive uplink BWPs other than the one active uplink BWP. The uplink BWP switch may be controlled by a BWP field included in downlink control information. The uplink BWP switch may be controlled based on a higher layer parameter.

Among one or multiple downlink BWPs configured for the serving cell, two or more downlink BWPs need not be configured for the active downlink BWP. For the serving cell, at certain time, one downlink BWP may be active.

Among one or multiple uplink BWPs configured for the serving cell, two or more uplink BWPs need not be configured for the active uplink BWP. For the serving cell, at certain time, one uplink BWP may be active.

Figure 6:
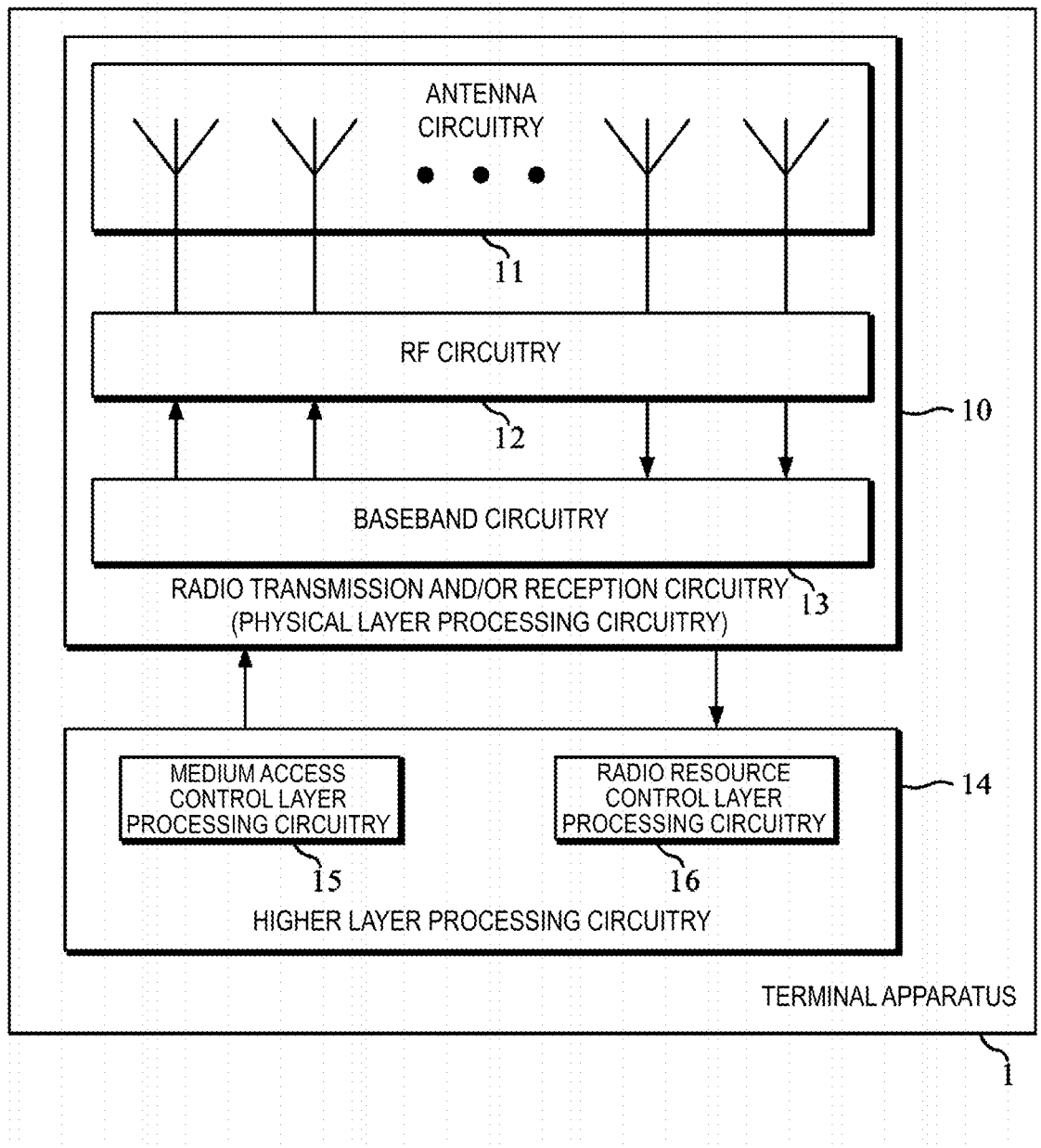
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 includes at least one or all of a radio transmission and/or reception circuitry (physical layer processing circuitry) 10 and a higher layer processing circuitry 14. The radio transmission and/or reception circuitry 10 includes at least a part or all of an antenna circuitry 11, an RF circuitry 12, and a baseband circuitry 13. The higher layer processing circuitry 14 includes at least a part or all of a medium access control layer processing circuitry 15 and a radio resource control layer processing circuitry 16.

The radio transmission and/or reception circuitry 10 includes at least a part or all of a radio transmission circuitry 10a and a radio reception circuitry 10b. Here, apparatus configurations of the baseband circuitry 13 included in the radio transmission circuitry 10a and the baseband circuitry 13 included in the radio reception circuitry 10b may be the same or different from each other. Apparatus configurations of the RF circuitry 12 included in the radio transmission circuitry 10a and the RF circuitry 12 included in the radio reception circuitry 10b may be the same or different from each other. Apparatus configurations of the antenna circuitry 11 included in the radio transmission circuitry 10a and the antenna circuitry 11 included in the radio reception circuitry 10b may be the same or different from each other.

For example, the radio transmission circuitry 10a may generate and transmit a baseband signal of the PRACH. For example, the radio transmission circuitry 10a may generate and transmit a baseband signal of the PUCCH. The radio transmission circuitry 10a may generate and transmit a baseband signal of the PUSCH. For example, the radio transmission circuitry 10a may generate and transmit a baseband signal of the PUCCH DMRS. For example, the radio transmission circuitry 10a may generate and transmit a baseband signal of the PUSCH DMRS. For example, the radio transmission circuitry 10a may generate and transmit a baseband signal of the UL PTRS. For example, the radio transmission circuitry 10a may generate and transmit a baseband signal of the SRS.

For example, the radio reception circuitry 10b may receive and demodulate the PDSCH. For example, the radio reception circuitry 10b may receive and demodulate the PDCCH. For example, the radio reception circuitry 10b may receive and demodulate the PBCH. For example, the radio reception circuitry 10b may receive the synchronization signal. For example, the radio reception circuitry 10b may receive the PDSCH DMRS. For example, the radio reception circuitry 10b may receive the PDCCH DMRS. For example, the radio reception circuitry 10b may receive the CSI-RS. For example, the radio reception circuitry 10b may receive the DL PTRS.

The higher layer processing circuitry 14 outputs uplink data (a transport block) to the radio transmission and/or reception circuitry 10 (or the radio transmission circuitry 10a). The higher layer processing circuitry 14 performs processing operations of the MAC layer, a packet data convergence protocol layer, a radio link control layer, and the RRC layer.

The medium access control layer processing circuitry 15 included in the higher layer processing circuitry 14 performs processing of the MAC layer.

The radio resource control layer processing circuitry 16 included in the higher layer processing circuitry 14 performs processing of the RRC layer. The radio resource control layer processing circuitry 16 manages various pieces of configuration information/parameters (RRC parameters) of the terminal apparatus 1. The radio resource control layer processing circuitry 16 sets the RRC parameters based on an RRC message received from the base station apparatus 3.

The radio transmission and/or reception circuitry 10 (or the radio transmission circuitry 10a) performs processing such as modulation and coding. The radio transmission and/or reception circuitry 10 (or the radio transmission circuitry 10a) generates a physical signal through modulation, coding, and baseband signal generation (conversion into the time-continuous signal) on the uplink data and transmits the physical signal to the base station apparatus 3. The radio transmission and/or reception circuitry 10 (or the radio transmission circuitry 10a) may map the physical signal to a certain BWP (an active uplink BWP) and transmit the physical signal to the base station apparatus 3.

The radio transmission and/or reception circuitry 10 (or the radio reception circuitry 10b) performs processing such as demodulation and decoding. The radio transmission and/or reception circuitry 10 (or the radio reception circuitry 30b) may receive a physical signal in a certain BWP (active downlink BWP) of a certain serving cell. The radio transmission and/or reception circuitry 10 (or the radio reception circuitry 10b) separates, demodulates, and decodes the received physical signal and outputs the decoded information to the higher layer processing circuitry 14. The radio transmission and/or reception circuitry 10 (radio reception circuitry 10b) may perform the channel access procedure prior to the transmission of the physical signal.

The RF circuitry 12 converts (down converts) a signal received via the antenna circuitry 11 into a baseband signal by means of quadrature demodulation and removes unnecessary frequency components. The RF circuitry 12 outputs a processed analog signal to the baseband circuitry 13.

The baseband circuitry 13 converts the analog signal input from the RF circuitry 12 into a digital signal. The baseband circuitry 13 removes a portion corresponding to a Cyclic Prefix (CP) from the converted digital signal, performs a Fast Fourier Transform (FFT) on the signal from which the CP has been removed, and extracts a signal in the frequency domain.

The baseband circuitry 13 performs Inverse Fast Fourier Transform (IFFT) on the uplink data to generate an OFDM symbol, adds a CP to the generated OFDM symbol, generates a baseband digital signal, and converts the baseband digital signal into an analog signal. The baseband circuitry 13 outputs the converted analog signal to the RF circuitry 12.

The RF circuitry 12 removes unnecessary frequency components from the analog signal input from the baseband circuitry 13 through a low-pass filter, up converts the analog signal into a signal having a carrier frequency, and transmits the signal via the antenna circuitry 11. The RF circuitry 12 may have a function of controlling transmission power. The RF circuitry 12 is also referred to as a transmission power control circuitry.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information that is generated in a higher layer. The uplink physical channel may be a physical channel used in the uplink component carrier. The uplink physical channel may be transmitted by the terminal apparatus 1. The uplink physical channel may be received by the base station apparatus 3. In the radio communication system according to an aspect of the present embodiment, at least a part or all of the following uplink physical channels may be used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit, uplink control information sequence, uplink control information type) includes at least a part or all of Channel State Information (CSI), a Scheduling Request (SR), and Hybrid Automatic Repeat request ACKnowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as a HARQ-ACK information bit or a HARQ-ACK information sequence.

The HARQ-ACK information may include at least a HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared CHannel (PUSCH)). The HARQ-ACK may indicate an acknowledgement (ACK) or a negative-acknowledgement (NACK) corresponding to the transport block. The ACK may indicate that decoding of the transport block has been decoded successfully. The NACK may indicate that decoding of the transport block has not been decoded successfully. The HARQ-ACK information may include a HARQ-ACK codebook including one or multiple HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for new transmission. The scheduling request bit may be used for indicating either of a positive SR or a negative SR. The scheduling request bit indicating the positive SR is also referred to as "the positive SR being transmitted". The positive SR may indicate that a resource of the PUSCH (or the UL-SCH) for new transmission is requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that a resource of the PUSCH (or the UL-SCH) for new transmission is not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least a part or all of a Channel Quality Indicator (CQI), a Precoder Matrix Indicator (PMI), and a Rank Indicator (RI). The CQI is an indicator related to quality (for example, propagation strength) of a propagation path or quality of a physical channel, and the PMI is an indicator related to a precoder. The RI is an indicator related to a transmission rank (or the number of transmission layers).

The channel state information may be given based at least on reception of a physical signal (for example, a CSI-RS) at least used for channel measurement. The channel state information may be selected by the terminal apparatus 1 based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. A PRACH sequence $x_{u,v}(n)$ is defined by $x_{u,v}(n) = x_u(\mod(n+C_v, L_{RA}))$. $x_u$ may be a Zadoff Chu (ZC) sequence. $x_u$ is defined by $x_u = \exp(-j\pi u i(i+1)/L_{RA})$. j is an imaginary unit, π is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. Each of the random access preambles is identified (determined, given) based at least on the cyclic shift C of the PRACH sequence and the sequence index u for the PRACH sequence. Each of the 64 identified random access preambles may be assigned an index.

The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the radio communication system according to an aspect of the present embodiment, at least a part or all of the following uplink physical signals may be used.

UpLink Demodulation Reference Signal (UL DMRS)
Sounding Reference Signal (SRS)
UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated (or may be scheduled) by one DCI format. The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a propagation path of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated (or may be triggered) by one DCI format. Resource element mapping of the PUCCH and/or resource element mapping of the DMRS for the PUCCH may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a propagation path of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the radio communication system according to an aspect of the present embodiment, at least a part or all of the following downlink physical channels may be used.

Physical Broadcast Channel (PBCH)
Physical Downlink Control Channel (PDCCH)
Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or multiple higher layer parameters.

The physical layer control information includes 8 bits. The physical layer control information may include at least a part or all of the following 0A to 0D. 0A) Radio frame bit 0B) half radio frame (half system frame, half frame) bit 0C) SS/PBCH block index bit 0D) subcarrier offset bit.

The radio frame bit is used for indicating a radio frame in which the PBCH is transmitted (radio frame including a slot in which the PBCH is transmitted). The radio frame bit includes 4 bits. The radio frame bit may include 4 bits out of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits out of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

A DCI format 0_0, a DCI format 0_1, a DCI format 1_0, and a DCI format 1_1 are DCI formats including a set of fields different from each other. An uplink DCI format is a general term for the DCI format 0_0 and the DCI format 0_1. A downlink DCI format is a general term for the DCI format 1_0 and the DCI format 1_1.

The DCI format 0_0 is at least used for scheduling the PUSCH of a certain cell (or mapped to a certain cell). The DCI format 0_0 includes at least a part or all of fields listed from 1A to 1E.

1A) Identifier field for DCI formats
1 B) Frequency domain resource assignmentfield
1C) Time domain resource assignment field
1D) Frequency hopping flag field
1E) Modulation and Coding Scheme (MCS) field The identifier field for DCI formats may indicate whether the DCI format including the identifier field for DCI formats is an uplink DCI format or a downlink DCI format. The identifier field for DCI formats included in the DCI format 0_0 may indicate 0 (or may indicate that the DCI format 0_0 is an uplink DCI format).

The frequency domain resource assignment field included in the DCI format 0_0 may be at least used for indicating assignment of frequency resources for the PUSCH.

The time domain resource assignment field included in the DCI format 0_0 may be at least used for indicating assignment of time resources for the PUSCH.

The frequency hopping flag field may be at least used for indicating whether frequency hopping is applied to the PUSCH.

The MCS field included in the DCI format 0_0 may be at least used for indicating a part or all of a modulation scheme for the PUSCH and/or a target coding rate. The target coding rate may be a target coding rate for the transport block of the PUSCH. The Transport Block Size (TBS) of the PUSCH may be given based at least on a part or all of the target coding rate and the modulation scheme for the PUSCH.

The DCI format 0_0 need not include a field used for a CSI request. In other words, CSI need not be requested by using the DCI format 0_0.

The DCI format 0_0 need not include a carrier indicator field. In other words, the uplink component carrier to which the PUSCH scheduled by a DCI format 0_0 is mapped may be the same as the uplink component carrier to which the PDCCH including the DCI format 0_0 is mapped.

The DCI format 0_0 need not include the BWP field. In other words, the uplink BWP to which the PUSCH scheduled by a DCI format 0_0 is mapped may be the same as the uplink BWP to which the PDCCH including the DCI format 0_0 is mapped.

The DCI format 0_1 is at least used for scheduling of the PUSCH of a certain cell (mapped to a certain cell). The DCI format 0_1 includes at least a part or all of fields listed from 2A to 2H.

2A) Identifier field for DCI formats
2B) Frequency domain resource assignment field
2C) Uplink time domain resource assignment field
2D) Frequency hopping flag field
2E) MCS field
2F) CSI request field 2G) BWP field 2H) Carrier indicator field The identifier field for DCI formats included in the DCI format 0_1 may indicate 0 (or may indicate that the DCI format 0_1 is an uplink DCI format).

The frequency domain resource assignment field included in the DCI format 0_1 may be at least used for indicating assignment of frequency resources for the PUSCH.

The time domain resource assignment field included in the DCI format 0_1 may be at least used for indicating assignment of time resources for the PUSCH.

The MCS field included in the DCI format 0_1 may be at least used for indicating a part or all of a modulation scheme for the PUSCH and/or a target coding rate.

In a case that the BWP field is included in the DCI format 0_1, the BWP field may be used for indicating an uplink BWP to which the PUSCH is mapped. In a case that the BWP field is not included in the DCI format 0_1, the uplink BWP to which the PUSCH is mapped may be the same as the uplink BWP to which the PDCCH including the DCI format 0_1 used for scheduling of the PUSCH is mapped. In a case that the number of uplink BWPs configured for the terminal apparatus 1 in a certain uplink component carrier is two or more, the number of bits of the BWP field included in the DCI format 0_1 used for scheduling of the PUSCH mapped to the certain uplink component carrier may be 1 bit or more. In a case that the number of uplink BWPs configured for the terminal apparatus 1 in a certain uplink component carrier is one, the number of bits of the BWP field included in the DCI format 0_1 used for scheduling of the PUSCH mapped to the certain uplink component carrier may be 0 bits (or the BWP field need not be included in the DCI format 0_1 used for scheduling of the PUSCH mapped to the certain uplink component carrier).

The CSI request field is at least used for indicating the report of the CSI.

In a case that the carrier indicator field is included in the DCI format 0_1, the carrier indicator field may be used for indicating the uplink component carrier to which the PUSCH is mapped. In a case that the carrier indicator field is not included in the DCI format 0_1, the uplink component carrier to which the PUSCH is mapped may be the same as the uplink component carrier to which the PDCCH including the DCI format 0_1 used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in the DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in the DCI format 0_1 used for scheduling of the PUSCH mapped to the certain serving cell group may be 0 bits (or the carrier indicator field need not be included in the DCI format 0_1 used for scheduling of the PUSCH mapped to the certain serving cell group).

The DCI format 1_0 is at least used for scheduling of the PDSCH of a certain cell (mapped to a certain cell). The DCI format 1_0 includes at least a part or all of 3A to 3F.

3A) Identifier field for DCI formats

3B) Frequency domain resource assignment field

3C) Time domain resource assignment field

3D) MCS field

3E) PDSCH to HARQ feedback timing indicator field

3F) PUCCH resource indicator field

The identifier field for DCI formats included in the DCI format 1_0 may indicate 1 (or may indicate that the DCI format 10 is a downlink DCI format).

The frequency domain resource assignment field included in the DCI format 1_0 may be at least used for indicating assignment of frequency resources for the PDSCH.

The time domain resource assignment field included in the DCI format 10 may be at least used for indicating assignment of time resources for the PDSCH.

The MCS field included in the DCI format 1_0 may be at least used for indicating a part or all of a modulation scheme for the PDSCH and/or a target coding rate. The target coding rate may be a target coding rate for the transport block of the PDSCH. The Transport Block Size (TBS) of the PDSCH may be given based at least on a part or all of the target coding rate and the modulation scheme for the PDSCH.

The PDSCH to HARQ feedback timing indicator field may be at least used for indicating an offset from the slot including the last OFDM symbol of the PDSCH to the slot including the first OFDM symbol of the PUCCH.

The PUCCH resource indicator field may be a field indicating an index of one of one or multiple PUCCH resources included in a PUCCH resource set. The PUCCH resource set may include one or multiple PUCCH resources.

The DCI format 10 need not include the carrier indicator field. In other words, the downlink component carrier to which the PDSCH scheduled by using a DCI format 1_0 is mapped may be the same as the downlink component carrier to which the PDCCH including the DCI format 1_0 is mapped.

The DCI format 10 need not include the BWP field. In other words, the downlink BWP to which the PDSCH scheduled by using a DCI format 1_0 is mapped may be the same as the downlink BWP to which the PDCCH including the DCI format 1_0 is mapped.

The DCI format 1_1 is at least used for scheduling the PDSCH of a certain cell (or mapped to a certain cell). The DCI format 1_1 includes at least a part or all of 4A to 4I.

4A) Identifier field for DCI formats

4B) Frequency domain resource assignment field

4C) Time domain resource assignment field

4E) MCS field

4F) PDSCH to HARQ feedback timing indicator field

4G) PUCCH resource indicator field

4H) BWP field

4I) Carrier indicator field

The identifier field for DCI formats included in the DCI format 1_1 may indicate 1 (or may indicate that the DCI format 1_1 is a downlink DCI format).

The frequency domain resource assignment field included in the DCI format 1_1 may be at least used for indicating assignment of frequency resources for the PDSCH.

The time domain resource assignment field included in the DCI format 1_1 may be at least used for indicating assignment of time resources for the PDSCH.

The MCS field included in the DCI format 1_1 may be at least used for indicating a part or all of the modulation scheme for the PDSCH and/or the target coding rate.

In a case that the PDSCH to HARQ feedback timing indicator field is included in the DCI format 1_1, the PDSCH to HARQ feedback timing indicator field may be at least used for indicating an offset from the slot including the last OFDM symbol of the PDSCH to the slot including the first OFDM symbol of the PUCCH. In a case that the PDSCH to HARQ feedback timing indicator field is not included in the DCI format 1_1, an offset from the slot including the last OFDM symbol of the PDSCH to the slot including the first OFDM symbol of the PUCCH may be identified by a higher layer parameter.

The PUCCH resource indicator field may be a field indicating an index of one of one or multiple PUCCH resources included in a PUCCH resource set.

In a case that the BWP field is included in the DCI format 1_1, the BWP field may be used for indicating the downlink BWP to which the PDSCH is mapped. In a case that the BWP field is not included in the DCI format 1_1, the downlink BWP to which the PDSCH is mapped may be the same as the downlink BWP to which the PDCCH including the DCI format 1_1 used for scheduling of the PDSCH is mapped. In a case that the number of downlink BWPs configured for the terminal apparatus 1 in a certain downlink component carrier is two or more, the number of bits of the BWP field included in the DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BWP field included in the DCI format 1_1 used for scheduling of the PDSCH mapped to the certain downlink component carrier may be 0 bits (or the BWP field need not be included in the DCI format 1_1 used for scheduling of the PDSCH mapped to the certain downlink component carrier).

In a case that the carrier indicator field is included in the DCI format 1_1, the carrier indicator field may be used for indicating the downlink component carrier to which the PDSCH is mapped. In a case that the carrier indicator field is not included in the DCI format 1_1, the downlink component carrier to which the PDSCH is mapped may be the same as the downlink component carrier to which the PDCCH including the DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in the DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in the DCI format 1_1 used for scheduling of the PDSCH mapped to the certain serving cell group may be 0 bits (or the carrier indicator field need not be included in the DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the radio communication system according to an aspect of the present embodiment, at least a part or all of the following downlink physical signals may be used.

Synchronization Signal (SS)
DownLink DeModulation Reference Signal (DL DMRS)
Channel State Information-Reference Signal (CSI-RS)
DownLink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
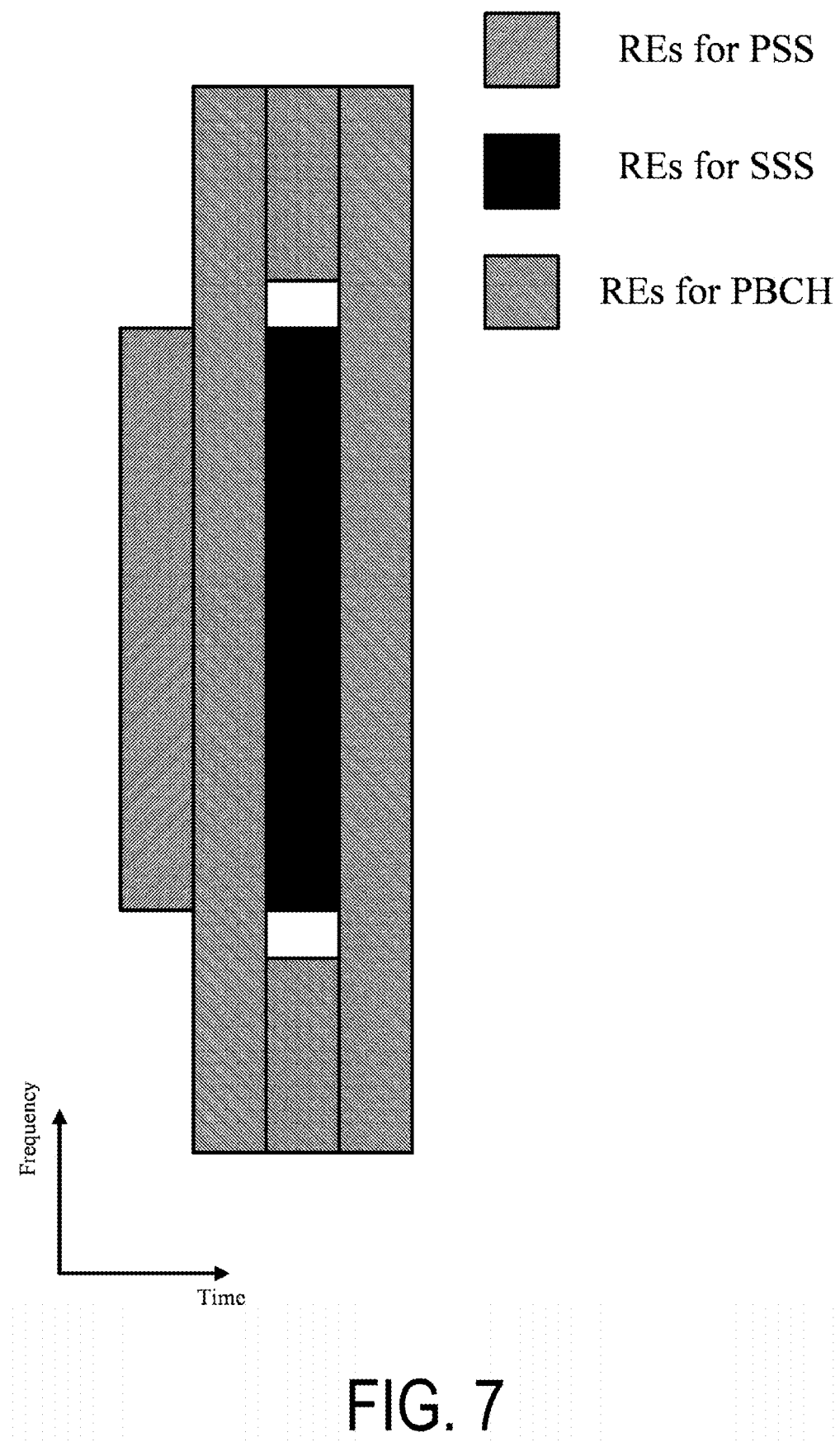
FIG. 7 is a diagram illustrating a configuration example of an SS/PBCH block according to an aspect of the present embodiment.

FIG. 7 is a diagram illustrating a configuration example of the SS/PBCH block according to an aspect of the present embodiment. In FIG. 7, the horizontal axis corresponds to a time axis (OFDM symbol index $l_{sym}$), and the vertical axis represents the frequency domain. A block hatched with upward sloping lines represents a set of resource elements for the PSS. A solid black block represents a set of resource elements for the SSS. A block hatched with downward sloping lines represents a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four consecutive OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH over which the symbol of the PBCH on a certain antenna port is conveyed may be inferred from the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a propagation path of the PDSCH may be inferred from the DMRS for the PDSCH. In a case that a set of resource elements in which the symbol of a certain PDSCH is conveyed and a set of resource elements in which the symbol of the DMRS for the certain PDSCH is conveyed are included in the same Precoding Resource Group (PRG), the PDSCH over which the symbol of the PDSCH on a certain antenna port is conveyed may be inferred from the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a propagation path of the PDCCH may be inferred from the DMRS for the PDCCH. In a case that the same precoder is (assumed to be) applied to a set of resource elements in which the symbol of a certain PDCCH is conveyed and a set of resource elements in which the symbol of the DMRS for the certain PDCCH is conveyed, the PDCCH over which the symbol of the PDCCH on a certain antenna port is conveyed may be inferred from the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. The Common Control CHannel (CCCH) may be used for transmitting a common RRC message in multiple terminal apparatuses 1. Here, the CCCH may be, for example, used for the terminal apparatus 1 that is not in a state of RRC connection. The Dedicated Control CHannel (DCCH) may be at least used for transmitting an RRC message dedicated to the terminal apparatus 1. Here, the DCCH may be, for example, used for the terminal apparatus 1 that is in a state of RRC connection.

The RRC message includes one or multiple RRC parameters (information elements). For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a dedicated RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Element (MAC CE). In other words, the higher layer parameter is a general term for the MIB, the system information, a message corresponding to the CCCH, a message corresponding to the DCCH, and parameters included in the MAC CE. The parameters included in the MAC CE are transmitted by a MAC Control Element (CE) command.

Procedures performed by the terminal apparatus 1 include at least a part or all of the following 5A to 5C.

5A) Cell search
5B) Random access
5C) Data communication

The cell search is a procedure used for the terminal apparatus 1 synchronizing with a certain cell related to the time domain and the frequency domain and detecting a physical cell identity (physical cell ID). In other words, by means of the cell search, the terminal apparatus 1 may perform synchronization with a certain cell in the time domain and the frequency domain and detect a physical cell ID.

A sequence of the PSS is given based at least on the physical cell ID. A sequence of the SSS is given based at least on the physical cell ID.

An SS/PBCH block candidate indicates a resource allowed to (possible to, scheduled to, configured to, defined to, having a possibility to) transmit the SS/PBCH block.

A set of SS/PBCH block candidates in a certain half radio frame is also referred to as an SS burst set. The SS burst set is also referred to as a transmission window, an SS transmission window, or a Discovery Reference Signal transmission window (DRS transmission window). The SS burst set is a general term including at least a first SS burst set and a second SS burst set.

The base station apparatus 3 transmits SS/PBCH blocks with one or multiple indices in a prescribed periodicity. The terminal apparatus 1 may detect at least one SS/PBCH block out of the SS/PBCH blocks with one or multiple indices and attempt decoding of the PBCH included in the at least one SS/PBCH block.

The random access is a procedure including at least a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or multiple PRACH occasions based at least on the index of the SS/PBCH block candidate detected based on the cell search. Each of the PRACH occasions is defined based at least on resources in the time domain and the frequency domain.

The terminal apparatus 1 transmits one random access preamble selected out of the PRACH occasions corresponding to the indices of the SS/PBCH block candidates in which the SS/PBCH block is detected.

The message 2 is a procedure for attempting to detect a DCI format 1_0 with a Cyclic Redundancy Check (CRC) scrambled with a Random Access-Radio Network Temporary Identifier (RA-RNTI) by the terminal apparatus 1. The terminal apparatus 1 attempts detection of the PDCCH including the DCI format in a control resource set given based on the MIB, which is included in the PBCH included in the SS/PBCH block detected based on cell search, and in resources indicated based on a configuration of a search space set. The message 2 is also referred to as a random access response.

The message 3 is a procedure for transmitting the PUSCH scheduled by using a random access response grant included in a DCI format 1_0 detected through the procedure of the message 2. Here, the random access response grant is indicated by the MAC CE included in the PDSCH scheduled by using the DCI format 1_0.

The PUSCH scheduled based on the random access response grant is either a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled by using a DCI format 0_0 with a CRC scrambled based on a Temporary Cell-Radio Network Temporary Identifier (TC-RNTI).

The message 4 is a procedure for attempting to detect a DCI format 1_0 with a CRC scrambled based on either of a Cell-Radio Network Temporary Identifier (C-RNTI) or a TC-RNTI. The terminal apparatus 1 receives a PDSCH scheduled based on the DCI format 1_0. The PDSCH may include a contention resolution ID.

Data communication is a general term for downlink communication and uplink communication.

In the data communication, the terminal apparatus 1 attempts detection of the PDCCH (monitors the PDCCH, supervises the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping) or may include distributed resources (interleaver mapping).

A set of resource blocks constituting the control resource set may be indicated by the higher layer parameter. The number of OFDM symbols constituting the control resource set may be indicated by the higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is related to (included in, corresponds to) a certain control resource set. The index of the control resource set related to the search space set may be indicated by the higher layer parameter.

For a certain search space set, a part or all of 6A to 6C may be indicated by at least the higher layer parameter.
  6A) PDCCH monitoring periodicity
  6B) PDCCH monitoring pattern within a slot
  6C) PDCCH monitoring offset The monitoring occasion of a certain search space set may correspond to the OFDM symbol to which the first OFDM symbol of a control resource set related to the certain search space set is mapped. The monitoring occasion of a certain search space set may correspond to a resource of a control resource set starting from the first OFDM symbol of the control resource set related to the certain search space set. The monitoring occasion of the search space set is given based at least on a part or all of the monitoring periodicity of the PDCCH, the monitoring pattern of the PDCCH in a slot, and the monitoring offset of the PDCCH.

Figure 8:
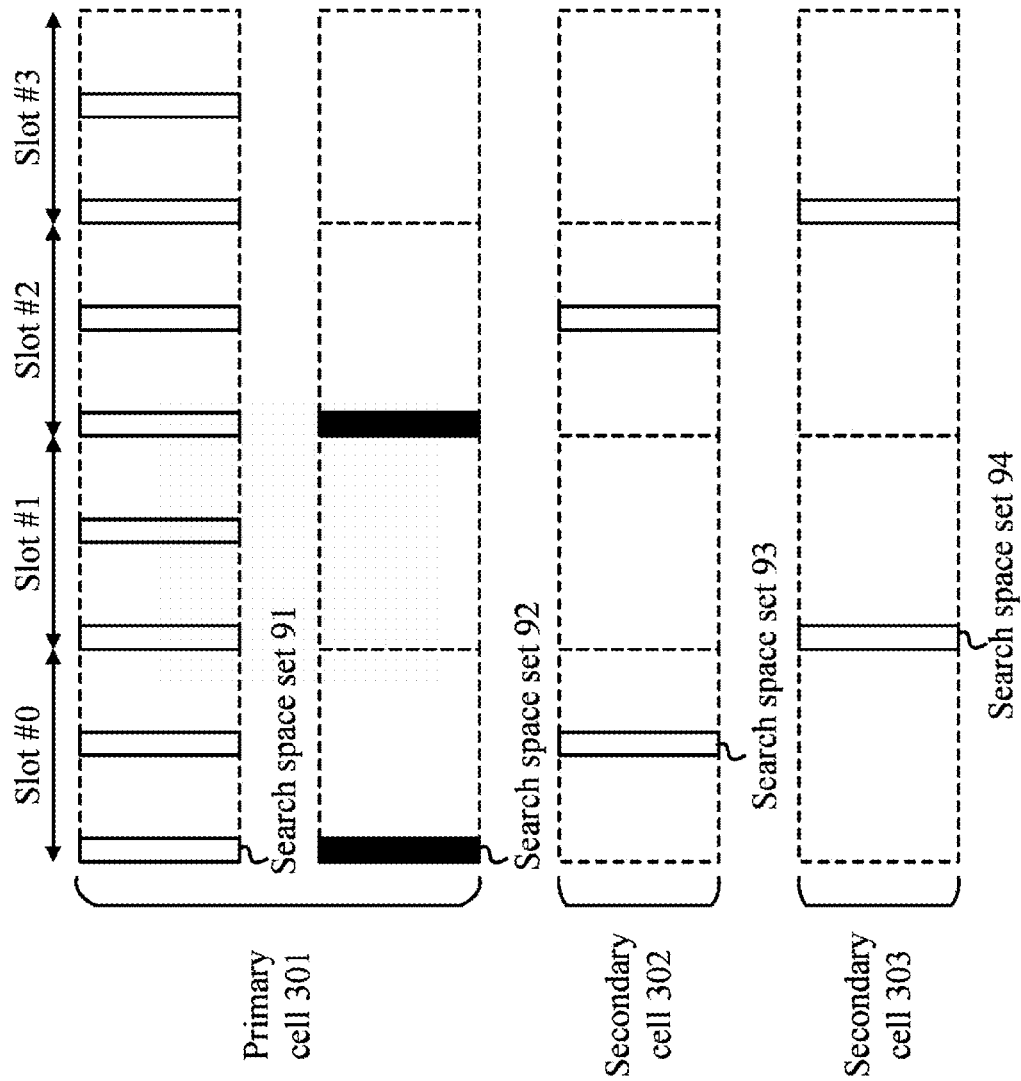
FIG. 8 is a diagram illustrating an example of monitoring occasions for search space sets according to an aspect of the present embodiment.

FIG. 8 is a diagram illustrating an example of the monitoring occasions for the search space sets according to an aspect of the present embodiment. In FIG. 8, a search space set 91 and a search space set 92 are configured in a primary cell 301, a search space set 93 is configured in a secondary cell 302, and a search space set 94 is configured in a secondary cell 303.

In FIG. 8, the solid white block in the primary cell 301 indicates a search space set 91, the solid black block in the primary cell 301 indicates a search space set 92, the block in the secondary cell 302 indicates a search space set 93, and the block in the secondary cell 303 indicates a search space set 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0, 0]. In other words, the monitoring occasions for the search space set 91 corresponds to the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 1, 0, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a Cell-Radio Network Temporary Identifier (C-RNTI).

The UE-specific PDCCH search space set may be at least used for the DCI format with a CRC sequence scrambled with a C-RNTI.

In the downlink communication, the terminal apparatus 1 detects a downlink DCI format. The detected downlink DCI format is at least used for resource assignment of the PDSCH. The detected downlink DCI format is also referred to as a downlink assignment. The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In the uplink communication, the terminal apparatus 1 detects an uplink DCI format. The detected DCI format is at least used for resource assignment of the PUSCH. The detected uplink DCI format is also referred to as an uplink grant. The terminal apparatus 1 performs transmission of the PUSCH.

In configured grant, the uplink grant for scheduling the PUSCH is configured for each transmission periodicity of the PUSCH. A part or all of pieces of information indicated by an uplink DCI format in a case that the PUSCH is scheduled by the uplink DCI format may be indicated by the uplink grant configured in a case of the configured grant.

The terminal apparatus 1 may be given one or multiple PUCCH resources by the higher layer. In the terminal apparatus 1, one or multiple PUCCH resources may be assigned to one PUCCH transmission. The PUCCH resource may be determined based at least on a part or all of elements P1 to P5. That is, a part or all of the elements P1 to P5 may be configured for the PUCCH resource. In addition, a part or all of the elements P1 to P5 may be configured for each PUCCH resource. For example, an n-th set may be configured for an n-th PUCCH resource. The n-th set may be a part or all of the elements P1 to P5. The n may be an integer of 1 or more. The fact that a certain higher layer parameter is configured for the PUCCH resource may be that the PUCCH resource includes the certain higher layer parameter or that the certain higher layer parameter characterizes the PUCCH resource. P1) an index of the PUCCH format, P2) an index of a first OFDM symbol of the PUCCH, P3) the number of OFDM symbols of the PUCCH, P4) an index of a first resource block of the PUCCH, and P5) the number of resource blocks of the PUCCH $M^{PUCCH}_{RB}$.

The PUCCH resource may be indicated based at least on the PUCCH resource indicator field in the DCI format indicating a certain PUCCH transmission. The certain PUCCH transmission may correspond to the PUCCH resource. Furthermore, the fact that the PUCCH resource is indicated by the PUCCH resource indicator field in the DCI format may be that the PUCCH transmission corresponding to the PUCCH resource is indicated by the DCI format. The fact that a certain PUCCH transmission corresponds to the PUCCH resource may be that at least a resource used for the certain PUCCH transmission is given. For example, the resource may be time. The resource may be a frequency or a frequency band.

In the terminal apparatus 1, one PUCCH resource set may be configured by a higher layer parameter pucch-ResourceCommon. The one PUCCH resource set may include 16 PUCCH resources.

In the terminal apparatus 1, a maximum of four PUCCH resource sets may be configured by a higher layer parameter pucch-ResourceSet. Each of the PUCCH resource sets may include one or multiple PUCCH resources. Each of the PUCCH resource sets may be associated with a PUCCH resource set index. The PUCCH resource set index may be given by a higher layer parameter pucch-ResourceSetId. Each of the PUCCH resource sets may be associated with a maximum UCI information bit. The maximum UCI information bit may be configured for each of the PUCCH resource sets by a higher layer parameter maxPayloadSize. In a case that the terminal apparatus 1 transmits the UCI by using the PUCCH resource in a certain PUCCH resource set, the information bit of the UCI need not exceed the maximum UCI information bit configured in the certain PUCCH resource set.

The index of the PUCCH format may indicate any value from PUCCH format 0 to PUCCH format 4. The index of the PUCCH format may be indicated by a higher layer parameter format. For example, in a case that the format is format 0 (or PUCCH-format 0), the PUCCH may correspond to PUCCH format 0. In a case that the format is format 1 (or PUCCH-format 1), the PUCCH may correspond to PUCCH format 1. In a case that the format is format 2 (or PUCCH-format 2), the PUCCH may correspond to PUCCH format 2. In a case that the format is format 3 (or PUCCH-format 3), the PUCCH may correspond to PUCCH format 3. In a case that the format is format 4 (or PUCCH-format 4), the PUCCH may correspond to PUCCH format 4.

For example, the fact that a certain PUCCH corresponds to a certain PUCCH format may be that the certain PUCCH includes the certain PUCCH format. Furthermore, the fact that a certain PUCCH corresponds to a certain PUCCH format may be that the certain PUCCH is generated based on the certain PUCCH format. Here, the PUCCH format may include at least a part or all of a scrambling method of the PUCCH, a modulation scheme configuration of the PUCCH, a time domain resource configuration of the PUCCH, a frequency domain configuration of the PUCCH, and a DMRS configuration for the PUCCH. The fact that a certain higher layer parameter is configured for the PUCCH format may be that the PUCCH format includes the certain higher layer parameter or that the certain higher layer parameter characterizes the PUCCH format. In addition, the fact that a certain higher layer parameter is configured for each of the PUCCH formats may be that an n-th certain higher layer parameter is configured for an n-th PUCCH format. The n may be an integer of 1 or more.

The index of the first OFDM symbol of the PUCCH may be the index of the first OFDM symbol to which the PUCCH is mapped. The index of the first OFDM symbol of the PUCCH may be determined by a higher layer parameter startingSymbolIndex corresponding to the PUCCH format selected by the PUCCH format index.

The number of OFDM symbols of the PUCCH may be the number of OFDM symbols to which the PUCCH is mapped. The number of OFDM symbols of the PUCCH may be determined by a higher layer parameter nrofsymbols corresponding to the PUCCH format selected by the PUCCH format index.

The number of resource blocks $M^{PUCCH}_{RB}$ of the PUCCH may be the maximum number of resource blocks to which the PUCCH is mapped. The number of resource blocks $M^{PUCCH}_{RB}$ of the PUCCH may be determined by a higher layer parameter nrofPRBs corresponding to the PUCCH format selected by the PUCCH format index.

The number of resource blocks $M^{PUCCH}_{RB,\ min}$ of the PUCCH may be the number of resource blocks to which the PUCCH is mapped. The number of resource blocks $M^{PUCCH}_{RB,\ min}$ of the PUCCH may be equal to the number of resource blocks $M^{PUCCH}_{RB}$ of the PUCCH or may be less than the number of resource blocks $M^{PUCCH}_{RB}$ of the PUCCH.

The number of resource blocks $M^{PUCCH}_{RB,\ min}$ of the PUCCH may be determined based at least on Relationship 1 and/or Relationship 2 in a case that the PUCCH format for the PUCCH is the PUCCH format 2 or the PUCCH format 3 and the PUCCH includes at least one or both of the HARQ-ACK and the SR. The number of PUCCH resource blocks $M^{PUCCH}_{RB,\ min}$ may be determined in accordance with at least both Relationship 1 and Relationship 2 based at least on that the number of PUCCH resource blocks $M^{PUCCH}_{RB}$ is greater than 1. The number of PRBs of the PUCCH may be $M^{PUCCH}_{RB,\ min}$, and the location of the PRB where the PUCCH starts may be determined based at least on the higher layer parameter StartingPRB or the higher layer parameter SecondHopPRB. The PRB indicated by the higher layer parameter StartingPRB may be referred to as a first PRB, and the PRB indicated by the higher layer parameter SecondHopPRB may be referred to as a second PRB.

$$N_{UCI} \leq M_{RB,min}^{PUCCH} \cdot N_{SC,ctrl}^{RB} \cdot N_{symb-UCI}^{PUCCH} \cdot Q_m \cdot r \quad \text{[Math. 1]}$$

$$N_{UCI} > (M_{RB,min}^{PUCCH}-1) \cdot N_{SC,ctrl}^{RB} \cdot N_{symb-UCI}^{PUCCH} \cdot Q_m \cdot r \quad \text{[Math. 2]}$$

$N_{UCI}$ may correspond to the number of uplink control information bits.

$N^{RB}_{SC,ctrl}$ may be determined based on the number of subcarriers $N^{RB}_{SC}$ per resource block. $N^{RB}_{SC,ctrl}$ for the PUCCH format 2 may be given by $N^{RB}_{SC,\ ctrl}-4$ or $(N^{RB}_{SC,\ ctrl}-4)/N^{PUCCH,\ 2}_{SF}$. $N^{RB}_{SC,\ ctrl}$ for the PUCCH format 3 may be given by $N^{RB}_{SC,\ ctrl}$ or $N^{RB}_{SC,\ ctrl}/N^{PUCCH,\ 3}_{SF}$. $N^{PUCCH,\ 2}_{SF}$ may be a value used for Spreading for PUCCH 2, and $N^{PUCCH,\ 3}_{SF}$ may be a value used for Block-wise Spreading for PUCCH 3.

$N^{PUCCH}_{symb-UCI}$ may correspond to the number of OFDM symbols to which the PUCCH is mapped. $N^{PUCCH}_{symb-UCI}$ for the PUCCH format 2 may be given by nrofSymbols in a higher layer parameter PUCCH-format 2. $N^{PUCCH}_{symb-UCI}$ for the PUCCH format 3 may be a value obtained by subtracting the number of OFDM symbols used in DMRS transmission for the PUCCH format 3 from a value given by nrofSymbols in a higher layer parameter PUCCH-format 3. $N^{PUCCH}_{symb-UCI}$ for the PUCCH format 4 may be a value obtained by subtracting the number of OFDM symbols used in DMRS transmission for the PUCCH format 4 from a value given by nrofSymbols in a higher layer parameter PUCCH-format 4.

$Q_m$ may correspond to a Modulation Order of the PUCCH.

r may correspond to a maximum coding rate (or simply referred to as a coding rate) of the PUCCH. r may be determined by a higher layer parameter maxCodeRate for the PUCCH format 2, 3, or 4. The maxCodeRate may be configured for each of the PUCCH formats.

In the PUCCH format 1, 3, or 4, the number of slots $N^{repeat}_{PUCCH}$ may be configured for repetition of the PUCCH transmission. $N^{repeat}_{PUCCH}$ may be determined by a higher layer parameter NrofSlots for the PUCCH format. That is, the NrofSlots may be a higher layer parameter indicating the number of repetitions for the PUCCH format corresponding to the PUCCH transmission. In addition, the NrofSlots may be configured for each of the PUCCH formats. A value of the NrofSlots may be any of 2, 4, and 8. For example, in a case that the value of the NrofSlots is 2, $N^{repeat}_{PUCCH}$ may be 2. In a case that the NrofSlots is not configured for the PUCCH format, $N^{repeat}_{PUCCH}$ may be 1.

Based at least on the fact that $N^{repeat}_{PUCCH}$ is greater than 1, the terminal apparatus 1 may repeat the PUCCH transmission including the UCI in $N^{repeat}_{PUCCH}$ slots. That is, the terminal apparatus 1 may repeat the PUCCH in $N^{repeat}_{PUCCH}$ slots. The repetition of PUCCHs may be transmitted in $N^{repeat}_{PUCCH}$ slots. The PUCCH transmissions in the $N^{repeat}_{PUCCH}$ slots may have the same number of OFDM symbols and may have the same first OFDM symbol index as each other. The number of OFDM symbols may be given by the higher layer parameter nrofSymbols corresponding to the PUCCH format selected by the PUCCH format index. The index of the first OFDM symbol may be given by the higher layer parameter startingSymbolIndex corresponding to the PUCCH format selected by the PUCCH format index. The $N^{repeat}_{PUCCH}$ slots may or may not be continuous. The $N^{repeat}_{PUCCH}$ slots may or may not be continuous. The $N^{repeat}_{PUCCH}$ slots may be referred to as the $N^{repeat}_{PUCCH}$ slots, and may be referred to as available slots.

A PUCCH corresponding to PUCCH format 1, 3, or 4 may be configured to perform frequency hopping between different slots based at least on repetition of transmission of the PUCCH in $N^{repeat}_{PUCCH}$ slots. The frequency hopping may be performed on a per slot basis, the PUCCH may be transmitted based on a first PRB in an even-numbered slot, and the PUCCH may be transmitted based on a second PRB in an odd-numbered slot. That is, an even-numbered repetition of the PUCCH may start from the first PRB, and an odd-numbered repetition of the PUCCH may start from the second PRB. The first PRB may be given by a higher layer parameter StartingPRB and the second PRB may be given by a higher layer parameter SecondHopPRB. With the slot designated for the first transmission of the PUCCH as zeroth slot, each subsequent slot until the PUCCH is transmitted in $N^{repeat}_{PUCCH}$ slots may be counted regardless of whether the terminal apparatus 1 transmits the PUCCH.

For example, in a case that $N^{repeat}_{PUCCH}$ is 4, the PUCCH may start from the first PRB in the first of $N^{repeat}_{PUCCH}$ slots, the PUCCH may start from the second PRB in the second of $N^{repeat}_{PUCCH}$ slots, the PUCCH may start from the first PRB in the third of $N^{repeat}_{PUCCH}$ slots, and the PUCCH may start from the second PRB in the fourth of $N^{repeat}_{PUCCH}$ slots.

For example, in a case that $N^{repeat}_{PUCCH}$ is 4, in the first of the $N^{repeat}_{PUCCH}$ slots, the PUCCH may be allocated at least in the first PRB, in the second of the $N^{repeat}_{PUCCH}$ slots, the PUCCH may be allocated at least in the second PRB, in the third of the $N^{repeat}_{PUCCH}$ slots, the PUCCH may be allocated at least in the first PRB, and in the fourth of the $N^{repeat}_{PUCCH}$ slots, the PUCCH may be allocated at least in the second PRB. The first of the $N^{repeat}_{PUCCH}$ slots may be associated with the first PRB, the third of the $N^{repeat}_{PUCCH}$ slots may be associated with the first PRB, and the fourth of the $N^{repeat}_{PUCCH}$ slots may be associated with the second PRB.

The terminal apparatus 1 need not expect that the frequency hopping is performed for the PUCCH transmission in a certain slot based at least on that the PUCCH transmission including the UCI is repeated in $N^{repeat}_{PUCCH}$ slots and that the frequency hopping is configured to be performed between different slots for the PUCCH transmission.

The frequency hopping from the first PRB provided by the higher layer parameter StartingPRB to the second PRB provided by the higher layer parameter SecondHopPRB may be the same in each slot based at least on that the PUCCH transmission including the UCI is repeated in $N^{repeat}_{PUCCH}$ slots, that the frequency hopping is not configured to be performed between different slots for the PUCCH transmission, and that the frequency hopping is configured to be performed within a slot for the PUCCH transmission.

The terminal apparatus 1 may determine $N^{repeat}_{PUCCH}$ slots for the PUCCH transmission starting from the first slot in time division duplex (TDD or unpaired spectrum). The first slot may be a slot indicated for reporting HARQ-ACK. The slot indicated for reporting the HARQ-ACK may be a slot indicated by a PDSCH_HARQ feedback timing indication field. The first slot may be a slot determined for transmitting a scheduling request. The first slot may be a slot determined for reporting the CSI.

The $N^{repeat}_{PUCCH}$ slots may have one OFDM symbol. For example, the $N^{repeat}_{PUCCH}$ slots may include the one OFDM symbol. The one OFDM symbol may correspond to an index of an OFDM symbol given in the startingSymbolIndex. For example, the one OFDM symbol may be provided by startingSymbolIndex. The one OFDM symbol may be a UL symbol or a flexible symbol. The one OFDM symbol need not be a symbol indicated for receiving the SS/PBCH block. The $N^{repeat}_{PUCCH}$ slots may include continuous OFDM symbols. For example, the $N^{repeat}_{PUCCH}$ slots may include continuous OFDM symbols. The number of continuous OFDM symbols may be the same as the number of OFDM symbols given in nrofSymbols. The number of continuous OFDM symbols may be greater than the number of OFDM symbols given in nrofSymbols. The continuous OFDM symbols may start from the one OFDM symbol. The continuous OFDM symbols may include one or multiple UL symbols or one or multiple flexible symbols. The continuous OFDM symbols may include one or multiple UL symbols and one or multiple flexible symbols. The continuous OFDM symbols may not be symbols indicated for receiving SS/PBCH blocks.

The $N^{repeat}_{PUCCH}$ slots may include UL slots. The UL slot may be a slot including UL symbols. The $N^{repeat}_{PUCCH}$ slots may include special slots. The special slot may be a slot including a UL symbol, a flexible symbol, and a DL symbol. The $N^{repeat}_{PUCCH}$ slots may not include a DL slot. The DL slot may be a slot including DL symbols. The $N^{repeat}_{PUCCH}$ slots need not include special slots associated with SS/PBCH blocks.

The UL symbol may be an OFDM symbol configured or indicated for uplink in the time division duplex. The UL symbol may be an OFDM symbol configured or indicated for the PUSCH, the PUCCH, the PRACH, or the SRS. The UL symbol may be configured by a higher layer parameter tdd-UL-DL-ConfigurationCommon. The UL symbol may be configured by a higher layer parameter tdd-UL-DL-ConfigurationDedicated.

The DL symbol may be an OFDM symbol configured or indicated for downlink in the time division duplex. The DL symbol may be an OFDM symbol configured or indicated for the PDSCH or the PDCCH. The DL symbol may be configured by a higher layer parameter tdd-UL-DL-ConfigurationCommon. The DL symbol may be configured by a higher layer parameter tdd-UL-DL-ConfigurationDedicated.

The flexible symbol may be an OFDM symbol that is not configured or indicated as a UL symbol or a DL symbol among OFDM symbols in a certain periodicity. The certain periodicity may be a periodicity given by a higher layer parameter dl-UL-TransmissionPeriodicity. The flexible symbol may be an OFDM symbol configured or indicated for the PDSCH, the PDCCH, the PUSCH, the PUCCH, or the PRACH.

The repetition of the PUCCH in each of the $N^{repeat}_{PUCCH}$ slots may start from the first PRB or the second PRB. That is, each of the $N^{repeat}_{PUCCH}$ slots may be associated with either the first PRB or the second PRB. The number of combinations in which each of the $N^{repeat}_{PUCCH}$ slots is associated with either the first PRB or the second PRB may be less than or equal to $2N^{repeat}_{PUCCH}$. The combination may be referred to as a Hopping Pattern.

The hopping pattern may be referred to as a Frequency Hopping Pattern. The hopping pattern may be referred to as an Inter-slot Frequency Hopping Pattern. The hopping pattern may indicate whether each of the $N^{repeat}_{PUCCH}$ slots is associated with the first PRB or the second PRB. The hopping pattern may indicate the PRB in which the repetition of the PUCCH is allocated. Based on the hopping pattern, whether the repetition of the PUCCH in each of the $N^{repeat}_{PUCCH}$ slots is allocated at least in the first PRB or at least in the second PRB may be determined. That is, the hopping pattern may correspond to determining whether the repetition of the PUCCH in each of the $N^{repeat}_{PUCCH}$ slots is allocated at least in the first PRB or at least in the second PRB. Based on the hopping pattern, whether the repetition of the PUCCH in each of the $N^{repeat}_{PUCCH}$ slots starts from the first PRB or the second PRB may be determined. That is, the hopping pattern may correspond to determining whether the repetition of the PUCCH in each of the $N^{repeat}_{PUCCH}$ slots starts from the first PRB or the second PRB. The presence of multiple hopping patterns may indicate that there are multiple combinations of PRBs in which $N^{repeat}_{PUCCH}$ slots and the repetition of the PUCCH are allocated.

The hopping pattern may include one or multiple bits and may be included in a DCI field in a DCI format. The hopping pattern may be one or multiple information bits and may be included in the DCI format. The hopping pattern may be a higher layer parameter or may be configured for a PUCCH resource.

Figure 9:
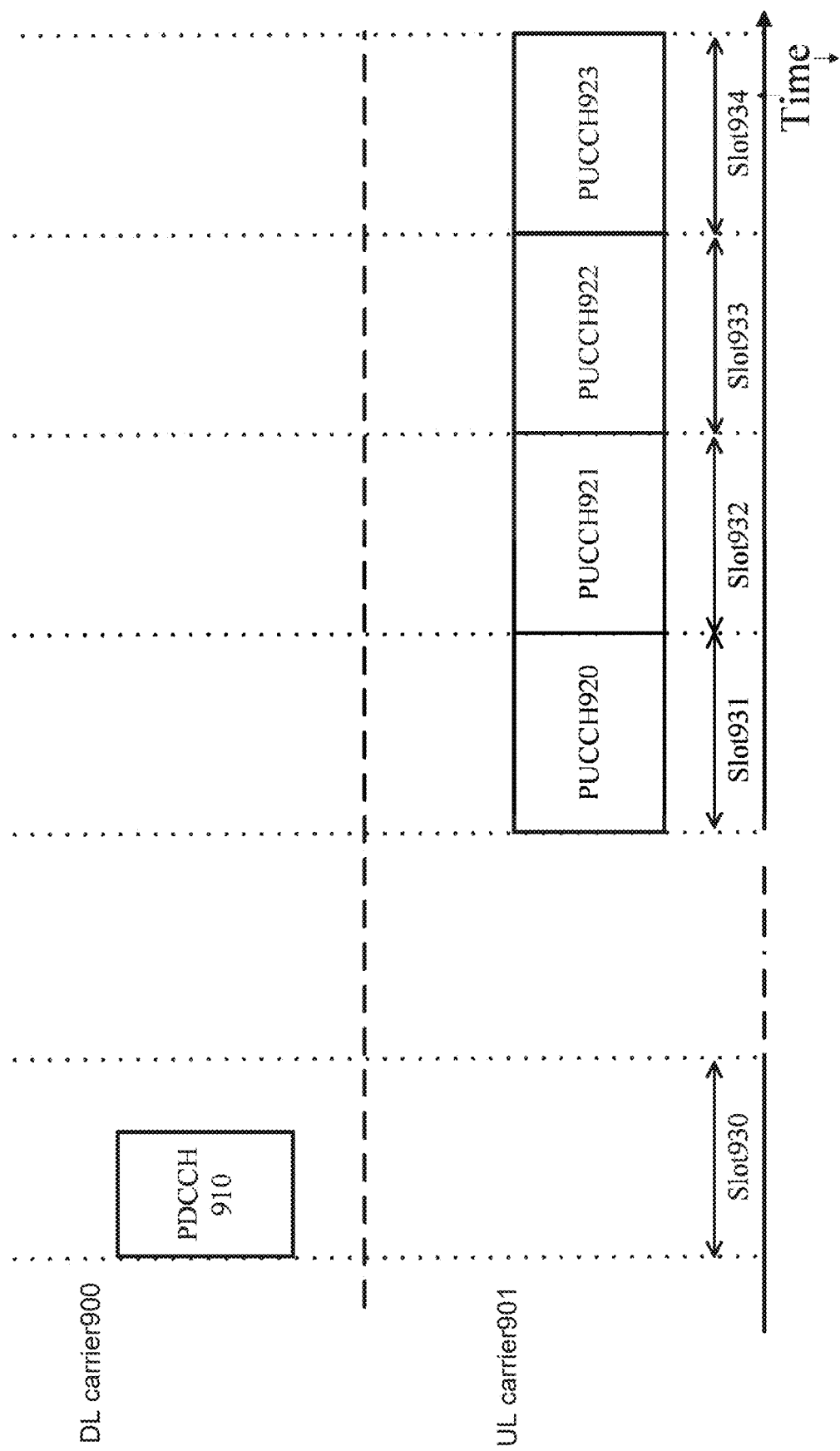
FIG. 9 is a diagram illustrating an example of repeated transmissions of PUCCH according to an aspect of the present embodiment.

FIG. 9 is a diagram illustrating an example of repeated transmissions of the PUCCH according to an aspect of the present embodiment. The terminal apparatus 1 receives PDCCH 910 in a slot 930 in the downlink BWP in a downlink carrier 900. In accordance with the indication of the DCI format included in the PDCCH 910, the terminal apparatus 1 transmits, in an uplink BWP in an uplink carrier 901, a PUCCH 920 in a slot 931, a PUCCH 921 in a slot 932, a PUCCH 922 in a slot 933, and a PUCCH 923 in a slot 934.

The PUCCH 921, PUCCH 922, and PUCCH 923 may be repetitions of the PUCCH 920. The DCI format in the PDCCH 910 may indicate transmission of the PUCCH 920 in the slot 931. In a case that the DCI format includes the PDSCH to HARQ feedback timing indicator field, a slot identified by the PDSCH to HARQ feedback timing indicator field may be the slot 931. The slot 931, the slot 932, the slot 933, and the slot 934 may be a part or all of the $N^{repeat}_{PUCCH}$ slots. The slot 931 and the slot 932 may or may not be continuous. The slot 932 and the slot 933 may be or may not be continuous. The slot 933 and the slot 934 may or may not be continuous. The slot 931 may be the first slot of the $N^{repeat}_{PUCCH}$ slots. The slot 932 may be the second slot of the $N^{repeat}_{PUCCH}$ slots. The slot 933 may be the third slot of the $N^{repeat}_{PUCCH}$ slots. The slot 934 may be the fourth slot of the $N^{repeat}_{PUCCH}$ slots.

FIG. 10 is a diagram illustrating a relationship among the slots in FIG. 9 according to an aspect of the present embodiment. One slot set may include one or multiple continuous slots. In case 1 in FIG. 10, the slot 931 and the slot 932 are continuous, the slot 932 and the slot 933 are continuous, and the slot 933 and the slot 934 are continuous. In case 2 in FIG. 10, the slot 931 and the slot 932 are continuous, the slot 932 and the slot 933 are continuous, and the slot 933 and the slot 934 are not continuous. In case 3 in FIG. 10, the slot 931 and the slot 932 are continuous, the slot 932 and the slot 933 are not continuous, and the slot 933 and the slot 934 are continuous. In Case 4 in FIG. 10, the slot 931 and the slot 932 are continuous, the slot 932 and the slot 933 are not continuous, and the slot 933 and the slot 934 are not continuous. In Case 5 in FIG. 10, the slot 931 and the slot 932 are not continuous, the slot 932 and the slot 933 are continuous, and the slot 933 and the slot 934 are continuous. In Case 6 in FIG. 10, the slot 931 and the slot 932 are not continuous, the slot 932 and the slot 933 are not continuous, and the slot 933 and the slot 934 are continuous. In Case 7 in FIG. 10, the slot 931 and the slot 932 are not continuous, the slot 932 and the slot 933 are continuous, and the slot 933 and the slot 934 are not continuous. In Case 8 in FIG. 10, the slot 931 and the slot 932 are not continuous, the slot 932 and the slot 933 are not continuous, and the slot 933 and the slot 934 are not continuous. Thus, in case 1, the slot set is one of slot sets #1-1. In case 2, there are two slot sets, slot set #2-1 and slot set #2-2. In Case 3, there are two slot sets, slot set #3-1 and slot set #3-2. In Case 4, there are three slot sets, slot set #4-1, slot set #4-2, and slot set #4-3. In Case 5, there are two slot sets, slot set #5-1 and slot set #5-2. In Case 6, there are three slot sets, slot set #6-1, slot set #6-2, and slot set #6-3. In Case 7, there are three slot sets, slot set #7-1, slot set #7-2, and slot set #7-3. In Case 8, there are four slot sets, slot set #8-1, slot set #8-2, slot set #8-3, and slot set #8-4.

The PUCCH 920 may be a repetition of the PUCCH in the first of the $N^{repeat}_{PUCCH}$ slots. The PUCCH 921 may be a repetition of the PUCCH in the second of the $N^{repeat}_{PUCCH}$ slots. The PUCCH 922 may be a repetition of the PUCCH in the third of the $N^{repeat}_{PUCCH}$ slots. The PUCCH 923 may be a repetition of the PUCCH in the fourth of the $N^{repeat}_{PUCCH}$ slots.

The number of repetitions for the PUCCH format corresponding to the PUCCH 920 may be indicated by the NrofSlots. That is, in a case that the NrofSlots is configured in the PUCCH format corresponding to the PUCCH 920, the number of repetitions of the PUCCH 920 may be a value indicated by the NrofSlots. A value of $N^{repeat}_{PUCCH}$ may be a value indicated by the NrofSlots. In a case that $N^{repeat}_{PUCCH}$ is 2, the repetition of the PUCCH 920 may be only the PUCCH 921. Furthermore, in a case that $N^{repeat}_{PUCCH}$ is 2, the repetition of the PUCCH may be the PUCCH 920 and the PUCCH 921. In a case that $N^{repeat}_{PUCCH}$ is 4, the repetition of the PUCCH 920 may be the PUCCH 921, the PUCCH 922, and the PUCCH 923. In a case that $N^{repeat}_{PUCCH}$ is 4, the repetition of the PUCCH may be the PUCCH 920, the PUCCH 921, the PUCCH 922, and the PUCCH 923.

The PUCCH resource corresponding to the PUCCH 920 may be the same as the PUCCH resource corresponding to the PUCCH 921, the PUCCH resource corresponding to the PUCCH 922, and the PUCCH resource corresponding to the PUCCH 923. In the terminal apparatus 1, the PUCCH resource corresponding to the PUCCH 920 may be indicated by the PDCCH 910.

The PUCCH resources corresponding to the PUCCH 920, the PUCCH 921, the PUCCH 922, and the PUCCH 923 being the same may be the PUCCH 920, the PUCCH 921, the PUCCH 922, and the PUCCH 923 corresponding to the same PUCCH format. The PUCCH resources corresponding to the PUCCH 920, the PUCCH 921, the PUCCH 922, and the PUCCH 923 being the same may be the PUCCH 920, the PUCCH 921, the PUCCH 922, and the PUCCH 923 corresponding to the same index of the PUCCH format.

The PUCCH resources corresponding to the PUCCH 920, the PUCCH 921, the PUCCH 922, and the PUCCH 923 being the same may be the same StartingPRB and SecondHopPRB being configured for the PUCCH 920, the PUCCH 921, the PUCCH 922, and the PUCCH 923.

The number of repetitions for the PUCCH 920 may be indicated based on the DCI format in the PDCCH 910. For example, the number of the repetitions may be indicated by a DCI field of the DCI format. The DCI field may be applied to the PUCCH transmission indicated by the DCI format. The DCI field may be referred to as a PUCCH-Repetition-Factor field.

The number of repetitions for the PUCCH 920 may be indicated based on the DCI format in the PDCCH 910. For example, the number of the repetitions may be configured for the PUCCH resource, and the PUCCH resource may be indicated by the PUCCH resource indicator field of the DCI format. The PUCCH resource may correspond to the PUCCH 920. That is, the number of repetitions may be configured for the PUCCH resource corresponding to the PUCCH 920 by a certain higher layer parameter. The certain higher layer parameter may be one element included in the PUCCH resource. The certain higher layer parameter may be referred to as RepetitionFactor-r17.

The PRB in which the PUCCH 920 is allocated may include the first PRB or the second PRB. The PRB in which the PUCCH 921 is allocated may include the first PRB or the second PRB. The PRB in which the PUCCH 922 is allocated may include the first PRB or the second PRB. The PRB in which the PUCCH 923 is allocated may include the first PRB or the second PRB. That is, the slot 931 may be associated with the first PRB or the second PRB. The slot 932 may be associated with the first PRB or the second PRB. The slot 933 may be associated with the first PRB or the second PRB. The slot 934 may be associated with the first PRB or the second PRB. That is, there may be 16 or less combinations of the PUCCH 920, the PUCCH 921, the PUCCH 922, and the PUCCH 923 based on whether the repetition of the PUCCH starts from the first PRB or the second PRB. FIG. 11 may be an example illustrating the combination.

FIG. 11 is a diagram illustrating an example of PRB allocations to repeated transmissions of the PUCCH in FIG. 9 according to an aspect of the present embodiment. In the first hopping pattern in FIG. 11, the PUCCH 920 may be associated with the first PRB, the PUCCH 921 may be associated with the first PRB, the PUCCH 922 may be associated with the first PRB, and the PUCCH 923 may be associated with the first PRB. In the second hopping pattern in FIG. 11, the PUCCH 920 may be associated with the first PRB, the PUCCH 921 may be associated with the first PRB, the PUCCH 922 may be associated with the first PRB, and the PUCCH 923 may be associated with the second PRB. In the third hopping pattern in FIG. 11, the PUCCH 920 may be associated with the first PRB, the PUCCH 921 may be associated with the first PRB, the PUCCH 922 may be associated with the second PRB, and the PUCCH 923 may be associated with the first PRB. In the fourth hopping pattern in FIG. 11, the PUCCH 920 may be associated with the first PRB, PUCCH 921 may be associated with the first PRB, the PUCCH 922 may be associated with the second PRB, and the PUCCH 923 may be associated with the second PRB. That is, in a case that $N^{repeat}_{PUCCH}$ is 4, one hopping pattern may be selected from 16 or less hopping patterns. For example, in a case that the PUCCH 920 is associated with the first PRB, one hopping pattern may be selected from the first through eighth hopping patterns. In a case that $N^{repeat}_{PUCCH}$ is 2, one hopping pattern may be selected from four or less hopping patterns. In a case that $N^{repeat}_{PUCCH}$ is 8, one hopping pattern may be selected from 256 or less hopping patterns. That is, there may be multiple hopping patterns for the repetition of the PUCCH, and one of the multiple hopping patterns may be used. The multiple hopping patterns in FIG. 11 may be configured for the terminal apparatus 1. The multiple hopping patterns in FIG. 11 may be predefined in the terminal apparatus 1. That is, indexes of the multiple hopping patterns and the multiple hopping patterns corresponding to the indexes may be configured for the terminal apparatus 1. Indexes of multiple hopping patterns and multiple hopping patterns corresponding to the indexes may be predefined in the terminal apparatus 1. Multiple hopping patterns may be configured. Multiple hopping patterns may be predefined. Predefining the multiple hopping patterns may include recording the multiple hopping patterns on a computer-readable recording medium.

Whether the repetition of the PUCCH is allocated at least in the first PRB or in the second PRB may be determined based on one of the multiple hopping patterns. Accordingly, as problem 1, the one hopping pattern needs to be provided to the terminal apparatus 1. For example, means 1, means 2, means 3, and means 4 for providing one hopping pattern to the terminal apparatus 1 may be used to solve problem 1, and means 5 and means 6 for determining one hopping pattern by the terminal apparatus 1 may be used to solve at least problem 1. The large number of the multiple hopping patterns is expected to improve communication performance by the frequency hopping rather than the small number of the multiple hopping patterns, but loads may be increased in a case that one hopping pattern is selected or determined. Accordingly, as problem 2, multiple hopping patterns the number of which is neither large nor small needs to be selected. For example, means 7 and means 8 for determining the multiple hopping patterns, based on the number of repetitions for the PUCCH may be used to solve at least problem 2.

In means 1, the DCI format included in the PDCCH 910 may include one hopping pattern for the PUCCH 920, the PUCCH 921, the PUCCH 922, and the PUCCH 923. One hopping pattern for the PDCCH 920, the PUCCH 921, the PUCCH 922, and the PUCCH 923 may be determined based on the DCI format included in the PUCCH 910. For example, the DCI format may include a field indicating the one hopping pattern. The one hopping pattern may include X bits. For example, the X may be the $N^{repeat}_{PUCCH}$. The X may be the maximum value of NrofSlots. The field indicating the one hopping pattern may be the X bits or more.

In means 2, one hopping pattern may be configured for the PUCCH resource corresponding to the PUCCH 920. One hopping pattern may be configured for the PUCCH resource indicated by the PUCCH resource indication field included in the DCI format in the PDCCH 910. A higher layer parameter indicating one hopping pattern may be configured for each PUCCH resource. For example, in a case that a certain PUCCH resource set includes $N_{set}$ PUCCH resources, a higher layer parameter indicating the one hopping pattern may be configured for each of the $N_{set}$ PUCCH resources. $N_{set}$ may be 8, 16, or 32. The one hopping pattern may include X bits. For example, the X may be the $N^{repeat}_{PUCCH}$. The X may be the maximum value of NrofSlots.

In means 1 and means 2, one hopping pattern may include $N^{repeat}_{PUCCH}$ values. Each of the values may be 0 or 1. In a case that the n-th value of one hopping pattern is 0, the repetition of the PUCCH in the n-th slot may be allocated at least in the first PRB, and in a case that the n th value of one hopping pattern is 1, the repetition of the PUCCH in the n-th slot may be allocated at least in the second PRB. In a case that the n-th value of one hopping pattern is 0, the repetition of the PUCCH in the n-th slot may be allocated at least in the second PRB, and in a case that the n-th value of one hopping pattern is 1, the repetition of the PUCCH in the n-th slot may be allocated at least in the first PRB. The n-th slot may be included in the $N^{repeat}_{PUCCH}$ slots. That is, n may be an integer from 1 to $N^{repeat}_{PUCCH}$. The one hopping pattern may include multiple bits including the first to the $N^{repeat}_{PUCCH}$-th values. For example, in a case that $N^{repeat}_{PUCCH}$ is 4 and the one hopping pattern is {0,0,0,0}, the one hopping pattern may be the first hopping pattern in FIG. 11. For example, in a case that $N^{repeat}_{PUCCH}$ is 4 and the one hopping pattern is {0,0,1,0}, the one hopping pattern may be the third hopping pattern in FIG. 11. For example, in a case that $N^{repeat}_{PUCCH}$ is 4 and the one hopping pattern is {0,1,0,0}, the one hopping pattern may be the fifth hopping pattern in FIG. 11. For example, in a case that $N^{repeat}_{PUCCH}$ is 4 and the one hopping pattern is {1, 0, 0, 0}, the one hopping pattern may be the ninth hopping pattern in FIG. 11.

In means 1 and means 2, one hopping pattern may include $N^{repeat}_{PUCCH}$ values. Each of the values may be 0 or 1. $N^{repeat}_{PUCCH}$ slots may be configured with $N^{repeat}_{PUCCH}$ slot sets. One slot set may include one or multiple continuous slots. In a case that the n-th value of one hopping pattern is 0, the repetition of the PUCCH in the n-th slot set may be allocated at least in the first PRB, and in a case that the n-th value of one hopping pattern is 1, the repetition of the PUCCH in the n-th slot set may be allocated at least in the second PRB. In a case that the n-th value of one hopping pattern is 0, the repetition of the PUCCH in the n-th slot set may be allocated at least in the second PRB, and in a case that the n-th value of one hopping pattern is 1, the repetition of the PUCCH in the n-th slot set may be allocated at least in the first PRB. n may be an integer from 1 to $N^{repeat}_{PUCCH}$. For example, in case 4 in FIG. 10, in a case that the one hopping pattern is {0,0,1}, the one hopping pattern may be the second hopping pattern in FIG. 11. For example, in case 4 in FIG. 10, in a case that the one hopping pattern is {0,1,0}, the one hopping pattern may be the third hopping pattern in FIG. 10. For example, in case 4 in FIG. 10, in a case that the one hopping pattern is {1, 0, 0}, the one hopping pattern may be the thirteenth hopping pattern in FIG. 10.

In means 1 and means 2, one hopping pattern may include $N^{repeat}_{PUCCH}-1$ values. Each of the values may be 0 or 1. In a case that the n-th value of one hopping pattern is 0, the repetition of the PUCCH in the n+1-th slot need not perform frequency hopping, and in a case that the n-th value of one hopping pattern is 1, the repetition of the PUCCH in the n+1-th slot may perform frequency hopping. In a case that the n-th value of one hopping pattern is 0, the repetition of the PUCCH in the n+1-th slot may perform frequency hopping, and in a case that the n-th value of one hopping pattern is 1, the repetition of the PUCCH in the n+1-th slot need not perform frequency hopping. The n-th slot may be included in the $N^{repeat}_{PUCCH}$ slots. That is, n may be an integer from 1 to $N^{repeat}_{PUCCH}$. That is, the one hopping pattern may include multiple bits including the first to the $N^{repeat}_{PUCCH}-1$-th values. For example, in a case that $N^{repeat}_{PUCCH}$ is 4 and the one hopping pattern is {0,0,0}, the one hopping pattern may be the first or the sixteenth hopping pattern in FIG. 10. For example, in a case that the $N^{repeat}_{PUCCH}$ is 4 and the one hopping pattern is {0,0,1}, the one hopping pattern may be the second or the fifteenth hopping pattern in FIG. 10. For example, in a case that the $N^{repeat}_{PUCCH}$ is 4 and the one hopping pattern is {0,1,0}, the one hopping pattern may be the fourth or thirteenth hopping pattern in FIG. 10. For example, in a case that the $N^{repeat}_{PUCCH}$ is 4 and the one hopping pattern is {1, 0, 0}, the one hopping pattern may be the eighth or ninth hopping pattern in FIG. 10. In a case that $N^{repeat}_{PUCCH}$ is 4, the one hopping pattern is {0,0,0}, and the first PUCCH repetition is based on the first PRB, the one hopping pattern maybe the first hopping pattern in FIG. 10.

In a case that the repetition of the PUCCH in the n-th slot is allocated at least in the first PRB, the repetition of the PUCCH in the n+1-th slot performing frequency hopping may include the repetition of the PUCCH in the n+1-th slot being allocated at least in the second PRB. In a case that the repetition of the PUCCH in the n-th slot is allocated at least in the second PRB, the repetition of the PUCCH in the n+1-th slot performing frequency hopping may include the repetition of the PUCCH in the n+1-th slot being allocated at least in the first PRB. In a case that the repetition of the PUCCH in the n-th slot is allocated at least in the first PRB, the repetition of the PUCCH in the n+1-th slot not performing frequency hopping may include the repetition of the PUCCH in the n+1-th slot being allocated at least in the first PRB. In a case that the repetition of the PUCCH in the n-th slot is allocated at least in the second PRB, the repetition of the PUCCH in the n+1-th slot not performing frequency hopping may include the repetition of the PUCCH in the n+1-th slot being allocated at least in the second PRB. The n-th slot may be a slot included in $N^{repeat}_{PUCCH}$. The n-th slot may correspond to the n-th repetition of the PUCCH. That is, n may be an integer from 1 to $N^{repeat}_{PUCCH}$.

In means 1 and means 2, one hopping pattern may include the $N^{repeat}_{PUCCH}-1$ values. Each of the values may be 0 or 1. $N^{repeat}_{PUCCH}$ slots may be configured with N PUCCH slot sets. One slot set may include one or multiple continuous slots. In a case that the n-th value of one hopping pattern is 0, the repetition of the PUCCH in the n+1-th slot set need not perform frequency hopping, and in a case that the n-th value of one hopping pattern is 1, the repetition of the PUCCH in the n+1-th slot set may perform frequency hopping. In a case that the n-th value of one hopping pattern is 0, the repetition of the PUCCH in the n+1-th slot set may perform frequency hopping, and in a case that the n-th value of one hopping pattern is 1, the repetition of the PUCCH in the n+1-th slot set need not perform frequency hopping. n may be an integer from 1 to $N^{repeat}_{PUCCH}$. For example, in case 4 in FIG. 10, in a case that the one hopping pattern is {0,1}, the one hopping pattern may be the second or fifteenth hopping pattern in FIG. 10. For example, in case 4 in FIG. 10, in a case that the one hopping pattern is {1, 0}, the one hopping pattern may be the fourth or thirteenth hopping pattern in FIG. 10. For example, in case 4 in FIG. 10, in a case that the one hopping pattern is {0,1} and the first PUCCH repetition is based on the first PRB, the one hopping pattern may be the second hopping pattern in FIG. 10.

In means 3, the DCI format included in PDCCH 910 may include the index of one hopping pattern for the PUCCH 920, the PUCCH 921, the PUCCH 922, and the PUCCH 923. The index of one hopping pattern for the PDCCH 920, the PUCCH 921, the PUCCH 922, and the PUCCH 923 may be determined based on the DCI format included in PUCCH 910. For example, the DCI format may indicate the index of one hopping pattern. For example, the DCI format may include a DCI field indicating the index of one hopping pattern. One of the multiple hopping patterns may be determined based on the index of the one hopping pattern. For example, in a case that the index of the one hopping pattern is 0, the first hopping pattern in FIG. 11 may be selected. In a case that the index of the one hopping pattern is 1, the second hopping pattern in FIG. 11 may be selected. In a case that the index of the one hopping pattern is 2, the third hopping pattern in FIG. 11 may be selected. In a case that the index of the one hopping pattern is 3, the fourth hopping pattern in FIG. 11 may be selected.

In means 4, the index of one hopping pattern indicating the one hopping pattern may be configured for the PUCCH resource corresponding to the PUCCH 920. The index of the one hopping pattern may be configured for the PUCCH resource indicated by the PUCCH resource indication field included in the DCI format in the PDCCH 910. A higher layer parameter indicating the index of the one hopping pattern may be configured for each PUCCH resource. For example, in a case that a certain PUCCH resource set includes $N_{set}$ PUCCH resources, a higher layer parameter indicating the index of the one hopping pattern may be configured for each of the $N_{set}$ PUCCH resources. $N_{set}$ may be 8, 16, or 32. The one hopping pattern may include X bits. For example, the X may be the $N^{repeat}_{PUCCH}$. The X may be the maximum value of NrofSlots. A field indicating the index of the one hopping pattern may be included. For example, in a case that the index of the one hopping pattern is 0, the first hopping pattern in FIG. 11 may be selected. In a case that the index of the one hopping pattern is 1, the second hopping pattern in FIG. 11 may be selected. In a case that the index of the one hopping pattern is 2, the third hopping pattern in FIG. 11 may be selected. In a case that the index of the one hopping pattern is 3, the fourth hopping pattern in FIG. 11 may be selected.

In means 3 and means 4, indexes of multiple hopping patterns corresponding to the multiple hopping patterns may be configured. In means 3 and means 4, the indexes of the multiple hopping patterns corresponding to the multiple hopping patterns may be predefined. Predefining the indexes of the multiple hopping patterns corresponding to the multiple hopping patterns may include recording the indexes in a computer-readable recording medium. For example, means 3 and means 4 may be able to identify one hopping pattern from multiple hopping patterns. For example, in means 3 and means 4, one index may be assigned to each of the multiple hopping patterns. For example, a certain index may be used to identify one of the multiple hopping patterns. For example, a first index may be assigned to a first hopping pattern of the multiple hopping patterns. A second index may be assigned to a second hopping pattern of the multiple hopping patterns. For example, in a case that $N^{repeat}_{PUCCH}$ is 4, the multiple hopping patterns and indexes of the multiple hopping patterns may be as illustrated in FIG. 11. That is, in a case that $N^{repeat}_{PUCCH}$ is 4, 16 or less hopping patterns and indexes of 16 or less hopping patterns may be configured or predefined. In a case that $N^{repeat}_{PUCCH}$ is 8, 256 or less hopping patterns and indexes of 256 or less hopping patterns may be configured or predefined. In means 3 and means 4, whether the repetition of the PUCCH in each of the $N^{repeat}_{PUCCH}$ slots is allocated at least in the first PRB or the second PRB may be determined based on one hopping pattern corresponding to the index of one hopping pattern.

In means 5, the terminal apparatus 1 may select one hopping pattern from the multiple hopping patterns. The hopping pattern may be selected from the multiple hopping patterns based at least on a first number of slots and a second number of slots. The first number of slots may be a number of continuous slots among the slots associated with the first PRB. The second number of slots may be a number of continuous slots among the slots associated with the second PRB. That is, the first number of slots may be the number of continuous slots among the slots in which the repetition of the PUCCH starts from the first PRB. The second number of slots may be the number of continuous slots among the slots in which the repetition of the PUCCH starts from the second PRB. When the $N^{repeat}_{PUCCH}$ is 4, the multiple hopping patterns may be the multiple hopping patterns illustrated in FIG. 11.

In means 5, the one hopping pattern may be selected from the multiple hopping patterns, based at least on a largest sum of the first number of slots and the second number of slots. For example, in case 3 in FIG. 10, one of the first, fourth, thirteenth, and sixteenth hopping patterns may be selected from the multiple hopping patterns in FIG. 11, and the sum may be 4. For example, in case 7 in FIG. 10, one of the first, second, seventh, eighth, ninth, tenth, fifteenth, and sixteenth hopping patterns may be selected from the multiple hopping patterns in FIG. 11, and the sum may be 4. For example, in case 3 in FIG. 10, in a case that the number of slots associated with the first PRB and the number of slots associated with the second PRB are the same and the slot 931 is associated with the first PRB, the fourth hopping pattern may be selected from the multiple hopping patterns in FIG. 10. For example, in case 7 in FIG. 10, in a case that the number of slots associated with the first PRB and the number of slots associated with the second PRB are the same and the slot 931 is associated with the first PRB, the seventh hopping pattern may be selected from the multiple hopping patterns in FIG. 10.

In means 5, the one hopping pattern may be selected from the multiple hopping patterns, based at least on a smallest difference between the first number of slots and the second number of slots. For example, in case 3 in FIG. 10, in a case that either the first PRB or the second PRB is associated with slot set #3-1 and either the first PRB or the second PRB is associated with slot set #3-2, either the fourth hopping pattern or the thirteenth hopping pattern may be selected from the multiple hopping patterns in FIG. 11, and the difference may be 0. For example, in case 7 in FIG. 10, in a case that either the first PRB or the second PRB is associated with slot set #7-1, either the first PRB or the second PRB is associated with slot set #7-2, and either the first PRB or the second PRB is associated with slot set #7-3, either the seventh or tenth hopping pattern may be selected from the multiple hopping patterns in FIG. 11, and the difference may be 0. In case 2 in FIG. 10, in a case that either the first PRB or the second PRB is associated with slot set #2-1 and either the first PRB or the second PRB is associated with slot set #2-2, either the second or the fifteenth hopping pattern may be selected from the multiple hopping patterns in FIG. 11, and the difference may be 1. In case 2 in FIG. 10, in a case that the first PRB is associated with slot set #2-1, either the first PRB or the second PRB is associated with slot set #2-2, and the slot 931 is associated with the first PRB, the second hopping pattern may be selected from the multiple hopping patterns in FIG. 11, and the difference may be 1.

In means 5, multiple hopping patterns may be configured or predefined. In means 5, indexes of the multiple hopping patterns may be configured or predefined. Such predefining may include recording the indexes in a computer-readable recording medium. For example, means 5 may be able to identify one hopping pattern from the multiple hopping patterns. For example, in means 5, one index may be assigned to each of the multiple hopping patterns. For example, a certain index may be used to identify one of the multiple hopping patterns. For example, a first index may be assigned to a first hopping pattern of the multiple hopping patterns. A second index may be assigned to a second hopping pattern of the multiple hopping patterns. For example, in a case that $N^{repeat}_{PUCCH}$ is 4, the multiple hopping patterns and indexes of the multiple hopping patterns may be as illustrated in FIG. 11. That is, in a case that $N^{repeat}_{PUCCH}$ is 4, 16 or less hopping patterns and indexes of 16 or less hopping patterns may be configured or predefined. In a case that $N^{repeat}_{PUCCH}$ is 8, 256 or less hopping patterns and indexes of 256 or less hopping patterns may be configured or predefined.

In means 6, the frequency hopping may be performed based on the terminal apparatus 1 satisfying condition 1, and need not be performed based on the terminal apparatus 1 satisfying condition 2. Satisfying the condition 1 may include the n-th slot for repetition of the PUCCH being not continuous with the n+1-th slot for repetition of the PUCCH. Satisfying the condition 2 may include the n-th slot for repetition of the PUCCH being continuous with the n+1-th slot for repetition of the PUCCH. The n may be an integer from 1 to $N^{repeat}_{PUCCH}$. That is, means 6 may perform frequency hopping for each slot set. For example, in case 2 in FIG. 10, the second or fifteenth hopping pattern in FIG. 11 may be selected. For example, in case 2 in FIG. 10, the same starting PRB as that of the second or fifteenth hopping pattern in FIG. 11 may be allocated. The starting PRB may be either the first PRB or the second PRB.

In problem 2, frequency diversity needs to be obtained, and the continuity of the slots needs to be maintained to reduce the load of selecting or determining one hopping pattern from multiple hopping patterns. The frequency diversity may be obtained by equally allocating the first PRB and the second PRB to the repetition of the PUCCH. The continuity of slots may be obtained by associating either the first PRB or the second PRB with the continuous slots. For example, in a case that one of two continuous slots is associated with the first PRB and the other of the two continuous slots is associated with the second PRB, the two continuous slots may be considered as not maintaining slot continuity. Reducing the load may be reducing the magnitude of the DCI field indicating one hopping pattern in means 1 or means 3, or reducing the magnitude of a higher layer parameter configured for each PUCCH resource and indicating one hopping pattern in means 2 or means 4. Reducing the load may be reducing candidates for the hopping pattern determined by the terminal apparatus 1 in means 5. For example, means 7 and means 8 may be used at least for solving problem 2.

In means 7, one hopping pattern from hopping patterns including some or all of the $N^{repeat}_{PUCCH}/2$ hopping patterns may be used for repetition of the PUCCH. Each of the $N^{repeat}_{PUCCH}/2$ hopping patterns may be a hopping pattern in which n-th to n+$N^{repeat}_{PUCCH}/2$-th slots for repetition of the PUCCH are associated with the second PRB. The n may be an integer from 2 to $N^{repeat}_{PUCCH}/2$. That is, each of the $N^{repeat}_{PUCCH}/2$ hopping patterns may be a hopping pattern in which the repetition of the PUCCH starts from the first PRB in the first slot for repetition of the PUCCH. Each of the $N^{repeat}_{PUCCH}/2$ hopping patterns may be a hopping pattern in which repetition of the PUCCH starts from the first PRB in the first set including $N^{repeat}_{PUCCH}/2$ slots. Each of the $N^{repeat}_{PUCCH}/2$ hopping patterns may be a hopping pattern in which repetition of the PUCCH starts from the second PRB in the second set including the $N^{repeat}_{PUCCH}/2$ slots. The first set need not include the slots included in the second set.

FIG. 12 is a diagram illustrating multiple hopping patterns in means 7 according to an aspect of the present embodiment. In means 7, the $N^{repeat}_{PUCCH}/2$ hopping patterns may be the hopping patterns illustrated in FIG. 12. For example, in a case that $N^{repeat}_{PUCCH}$ is 4, the $N^{repeat}_{PUCCH}/2$ hopping patterns may be such that the first of the $N^{repeat}_{PUCCH}$ slots is associated with the first PRB, the second of the $N^{repeat}_{PUCCH}$ slots is associated with the first PRB, the third of the $N^{repeat}_{PUCCH}$ slots is associated with the second PRB, and the fourth of the $N^{repeat}_{PUCCH}$ slots is associated with the second PRB. For example, in a case that $N^{repeat}_{PUCCH}$ is 4, the $N^{repeat}_{PUCCH}/2$ hopping patterns may be such that the first of the $N^{repeat}_{PUCCH}$ slots is associated with the first PRB, the second of the $N^{repeat}_{PUCCH}$ slots is associated with the second PRB, the third of the $N^{repeat}_{PUCCH}$ slots is associated with the second PRB, and the fourth of the $N^{repeat}_{PUCCH}$ slots is associated with the first PRB.

In means 7, in a case that $N^{repeat}_{PUCCH}$ is 8, the $N^{repeat}_{PUCCH}/2$ hopping patterns may be such that the first of the $N^{repeat}_{PUCCH}$ slots is associated with the first PRB, the second of the $N^{repeat}_{PUCCH}$ slots is associated with the first PRB, the third of the $N^{repeat}_{PUCCH}$ slots is associated with the first PRB, the fourth of the $N^{repeat}_{PUCCH}$ slots is associated with the first PRB, the fifth of the $N^{repeat}_{PUCCH}$ slots is associated with the second PRB, the sixth of the $N^{repeat}_{PUCCH}$ slots is associated with the second PRB, the seventh of the $N^{repeat}_{PUCCH}$ slots is associated with the second PRB, and the eighth of the $N^{repeat}_{PUCCH}$ slots is associated with the second PRB. In a case that $N^{repeat}_{PUCCH}$ is 8, the $N^{repeat}_{PUCCH}/2$ hopping patterns may be such that the first of the $N^{repeat}_{PUCCH}$ slots is associated with the first PRB, the second of the $N^{repeat}_{PUCCH}$ slots is associated with the first PRB, the third of the $N^{repeat}_{PUCCH}$ slots is associated with the first PRB, the fourth of the $N^{repeat}_{PUCCH}$ slots is associated with the second PRB, the fifth of the $N^{repeat}_{PUCCH}$ slots is associated with the second PRB, the sixth of the $N^{repeat}_{PUCCH}$ slots is associated with the second PRB, the seventh of the $N^{repeat}_{PUCCH}$ slots is associated with the second PRB, and the eighth of the $N^{repeat}_{PUCCH}$ slots is associated with the first PRB. In a case that $N^{repeat}_{PUCCH}$ is 8, the $N^{repeat}_{PUCCH}/2$ hopping patterns may be such that the first of the $N^{repeat}_{PUCCH}$ slots is associated with the first PRB, the second of the $N^{repeat}_{PUCCH}$ slots is associated with the second PRB, the third of the $N^{repeat}_{PUCCH}$ slots is associated with the second PRB, the fourth of the $N^{repeat}_{PUCCH}$ slots is associated with the second PRB, the fifth of the $N^{repeat}_{PUCCH}$ slots is associated with the second PRB, the sixth of the $N^{repeat}_{PUCCH}$ slots is associated with the first PRB, the seventh of the $N^{repeat}_{PUCCH}$ slots is associated with the first PRB, and the eighth of the $N^{repeat}_{PUCCH}$ slots is associated with the first PRB.

In FIG. 12A, slot #1 may be the slot 931, slot #2 may be the slot 932, slot #3 may be the slot 933, and slot #4 may be the slot 934. In FIG. 12A, PUCCH #1 may be the PUCCH 920, PUCCH #2 may be the PUCCH 921, PUCCH #3 may be the PUCCH 922, and PUCCH #4 may be the PUCCH 923. The first hopping pattern in FIG. 12A may be the fourth hopping pattern in FIG. 11. The second hopping pattern in FIG. 12A may be the seventh hopping pattern in FIG. 11. In means 1, means 2, means 3, means 4, and means 5, one hopping pattern among the $N^{repeat}_{PUCCH}/2$ hopping patterns in means 7 may be used. The multiple hopping patterns in means 1, means 2, means 3, means 4, and means 5 may be the $N^{repeat}_{PUCCH}/2$ hopping patterns in means 7. In means 3 and means 4, in a case that the index of one hopping pattern is 0, the first hopping pattern in FIG. 12 may be selected. In a case that the index of the one hopping pattern is 1, the second hopping pattern in FIG. 12 may be selected.

In means 8, one hopping pattern from hopping patterns including some or all of the $N^{repeat}_{PUCCH}/2-1$ hopping patterns may be used for repetition of the PUCCH. Each of the $N^{repeat}_{PUCCH}/2-1$ hopping patterns may be a hopping pattern in which the repetition of the PUCCH is allocated at least in the first PRB in a first slot for the repetition of the PUCCH. Each of the $N^{repeat}_{PUCCH}/2-1$ hopping patterns may be a hopping pattern in which a slot with repetition of the PUCCH allocated at least in the first PRB is not continuous with a slot with repetition of the PUCCH allocated at least in the second PRB.

FIG. 13 is a diagram illustrating multiple hopping patterns in means 8 according to an aspect of the present embodiment. In means 8, the $N^{repeat}_{PUCCH}/2-1$ hopping patterns may be the hopping patterns illustrated in FIG. 13. The $N^{repeat}_{PUCCH}$ slots for repetition of the PUCCH may include the $N^{repeat}_{PUCCH}$ slot sets. One slot set may include one or multiple continuous slots. For example, in a case that $N^{repeat}_{PUCCH}$ is 4, the $N^{repeat}_{PUCCH}/2-1$ hopping patterns may be such that the first of the $N^{repeat}_{PUCCH}$ slot sets is associated with the first PRB, the second of the $N^{repeat}_{PUCCH}$ slot sets is associated with the first PRB, the third of the $N^{repeat}_{PUCCH}$ slot sets is associated with the second PRB, and the fourth of the $N^{repeat}_{PUCCH}$ slot sets is associated with the second PRB. For example, for case 1 in FIG. 10, slot set #1-1 may be associated with the first PRB. For example, for case 2 in FIG. 10, slot set #2-1 may be associated with the first PRB and slot set #2-2 may be associated with the second PRB. For example, for case 3 in FIG. 10, slot set #3-1 may be associated with the first PRB and slot set #3-2 may be associated with the second PRB. For example, for case 4 in FIG. 10, slot set #4-1 may be associated with the first PRB, slot set #4-2 may be associated with the second PRB, and slot set #4-3 may be associated with the first PRB. For example, for case 5 in FIG. 10, slot set #5-1 may be associated with the first PRB and slot set #5-2 may be associated with the second PRB. For case 6 in FIG. 10, slot set #6-1 may be associated with the first PRB, slot set #6-2 may be associated with the second PRB, and slot set #6-3 may be associated with the first PRB. For case 7 in FIG. 10, slot set #7-1 may be associated with the first PRB, slot set #7-2 may be associated with the second PRB, and slot set #7-3 may be associated with the first PRB. For case 8 in FIG. 10, slot set #8-1 may be associated with the first PRB, slot set #8-2 may be associated with the second PRB, slot set #8-3 may be associated with the first PRB, and slot set #8-4 may be associated with the second PRB. In a case that $N^{repeat}_{PUCCH}$ is 4, the hopping pattern in means 8 may be the same as the hopping pattern in means 6.

In means 8, in a case that $N^{repeat}_{PUCCH}$ is 8, the $N^{repeat}_{PUCCH}/2-1$ hopping patterns may be the hopping patterns illustrated in FIG. 13B. For example, each of the $N^{repeat}_{PUCCH}/2-1$ hopping patterns may be a hopping pattern in which the first slot set of $N^{repeat}_{PUCCH}$ slots is associated with the first PRB and the second slot set of $N^{repeat}_{PUCCH}$ slots is associated with the second PRB. For example, each of the $N^{repeat}_{PUCCH}/2-1$ hopping patterns may be a hopping pattern in which the first of the $N^{repeat}_{PUCCH}$ slot sets is associated with the first PRB, the second of the $N^{repeat}_{PUCCH}$ slot sets is associated with the first PRB, the third of the $N^{repeat}_{PUCCH}$ slot sets is associated with the second PRB, and the fourth of the $N^{repeat}_{PUCCH}$ slot sets is associated with the second PRB. For example, each of the $N^{repeat}_{PUCCH}/2-1$ hopping patterns may be such that the first of the $N^{repeat}_{PUCCH}$ slot sets is associated with the first PRB, the second of the $N^{repeat}_{PUCCH}$ slot sets is associated with the first PRB, the third of the $N^{repeat}_{PUCCH}$ slot sets is associated with the first PRB, the fourth of the $N^{repeat}_{PUCCH}$ slot sets is associated with the second PRB, the fifth of the $N^{repeat}_{PUCCH}$ slot sets is associated with the second PRB, and the sixth of the $N^{repeat}_{PUCCH}$ slot sets is associated with the first PRB. That is, each of the $N^{repeat}_{PUCCH}/2-1$ hopping patterns may be a hopping pattern in which frequency hopping is performed for every n' slot sets. The n' may be an integer from 1 to $N^{repeat}_{PUCCH}/2-1$.

Various aspects of apparatuses according to an aspect of the present embodiment will be described below.

(1) In order to accomplish the object described above, an aspect of the present invention is contrived to provide the following means. Specifically, a first aspect of the present invention is a terminal apparatus including a receiver configured to receive a PDCCH including a DCI format indicating transmission of a PUCCH, and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern from multiple hopping patterns is determined based on the DCI format, and whether repetition of the PUCCH in each of the $N^{repeat}_{PUCCH}$ slots is allocated at least in the first PRB or at least in the second PRB is determined based on the one hopping pattern.

(2) A second aspect of the present invention is a terminal apparatus including a receiver configured to receive a PDCCH including a DCI format indicating transmission of a PUCCH, and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern from multiple hopping patterns is determined based on a PUCCH resource corresponding to the PUCCH, and whether repetition of the PUCCH in each of the $N^{repeat}_{PUCCH}$ slots is allocated at least in the first PRB or at least in the second PRB is determined based on the one hopping pattern.

(3) A third aspect of the present invention is a terminal apparatus including a receiver configured to receive a PDCCH including a DCI format indicating transmission of a PUCCH, and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, an index of one hopping pattern is determined based on the DCI format, one hopping pattern from multiple hopping patterns is determined based at least on the index of the one hopping pattern, and whether repetition of the PUCCH in each of the $N^{repeat}_{PUCCH}$ slots is allocated at least in the first PRB or at least in the second PRB based on the one hopping pattern.

(4) A fourth aspect of the present invention is a terminal apparatus including a receiver configured to receive a PDCCH including a DCI format indicating transmission of a PUCCH, and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, an index of one hopping pattern is determined based on a PUCCH resource corresponding to the PUCCH, one hopping pattern from multiple hopping patterns is determined based at least on the index of the one hopping pattern, and whether repetition of the PUCCH in each of the $N^{repeat}_{PUCCH}$ slots is allocated at least in the first PRB or at least in the second PRB is determined based on the one hopping pattern.

The first aspect and the second aspect of the present invention is the terminal apparatus in which, the one hopping pattern may include the $N^{repeat}_{PUCCH}$ bits, and in a case that a value of an n-th bit of the one hopping pattern is 0, the repetition of the PUCCH in the n-th slot may be allocated at least in the first PRB, and in a case that the value of the n-th bit of the one hopping pattern is 1, the repetition of the PUCCH in the n-th slot may be allocated at least in the second PRB, and the n may be an integer from 1 to the $N^{repeat}_{PUCCH}$.

The first aspect and the second aspect of the present invention is the terminal apparatus in which, the $N^{repeat}_{PUCCH}$ slots may include $N^{repeat}_{PUCCH}$ slot sets, each of the $N^{repeat}_{PUCCH}$ slot sets may be configured with one or multiple continuous slots, the one hopping pattern may include the $N^{repeat}_{PUCCH}$ bits, in a case that a value of an n-th bit of the one hopping pattern is 0, the repetition of the PUCCH in the n-th slot set may be allocated at least in the first PRB, in a case that a value of the n-th bit of the one hopping pattern is 1, the repetition of the PUCCH in the n th slot set may be allocated at least in the second PRB, and the n may be an integer from 1 to the $N^{repeat}_{PUCCH}$.

The first aspect and the second aspect of the present invention is the terminal apparatus in which, the one hopping pattern may include the $N^{repeat}_{PUCCH}-1$ bits; in a case that a value of an n-th bit of the one hopping pattern is 0, the repetition of the PUCCH in an n+1-th slot may not perform frequency hopping; in a case that the value of the n-th bit of the one hopping pattern is 1, the repetition of the PUCCH in the n+1-th slot may perform frequency hopping; in a case that the repetition of the PUCCH in the n-th slot is allocated at least in the first PRB, the repetition of the PUCCH in the n+1-th slot performing frequency hopping may be allocating, at least in the second PRB, the repetition of the PUCCH in the n+1-th slot; in a case that the repetition of the PUCCH in the n-th slot is allocated at least in the second PRB, the repetition of the PUCCH in the n+1-th slot performing frequency hopping may be allocating, at least in the first PRB, the repetition of the PUCCH in the n+1-th slot; in a case that the repetition of the PUCCH in the n-th slot is allocated at least in the first PRB, the repetition of the PUCCH in the n+1-th slot not performing frequency hopping may be allocating, at least in the first PRB, the repetition of the PUCCH in the n+1-th slot; in a case that the repetition of the PUCCH in the n-th slot is allocated at least in the second PRB, the repetition of the PUCCH in the n+1-th slot not performing frequency hopping may be allocating, at least in the second PRB, the repetition of the PUCCH in the n+1-th slot, and the n may be an integer from 1 to the $N^{repeat}_{PUCCH}-1$.

The first aspect and the second aspect of the present invention is the terminal apparatus in which, the $N^{repeat}_{PUCCH}$ slots may be configured with the $N^{repeat}_{PUCCH}$ slot sets, each of the $N^{repeat}_{PUCCH}$ slot sets may include one or multiple continuous slots, the one hopping pattern may include the $N^{repeat}_{PUCCH}-1$ bits; in a case that a value of an n-th bit of the one hopping pattern is 0, the repetition of the PUCCH in an n+1-th slot may not perform frequency hopping; in a case that the value of the n-th bit of the one hopping pattern is 1, the repetition of the PUCCH in the n+1-th slot may perform frequency hopping; in a case that the repetition of the PUCCH in the n th slot is allocated at least in the first PRB, the repetition of the PUCCH in the n+1-th slot performing frequency hopping may be allocating, at least in the second PRB, the repetition of the PUCCH in the n+1-th slot; in a case that the repetition of the PUCCH in the n-th slot is allocated at least in the second PRB, the repetition of the PUCCH in the n+1-th slot performing frequency hopping may be allocating, at least in the first PRB, the repetition of the PUCCH in the n+1-th slot; in a case that the repetition of the PUCCH in the n-th slot is allocated at least in the first PRB, the repetition of the PUCCH in the n+1-th slot not performing frequency hopping may be allocating, at least in the first PRB, the repetition of the PUCCH in the n+1-th slot; in a case that the repetition of the PUCCH in the n-th slot is allocated at least in the second PRB, the repetition of the PUCCH in the n+1-th slot not performing frequency hopping may be allocating, at least in the second PRB, the repetition of the PUCCH in the n+1-th slot, and then may be an integer from 1 to the $N^{repeat}_{PUCCH}-1$.

(5) A fifth aspect of the present invention is a terminal apparatus including a receiver configured to receive a PDCCH including a DCI format indicating transmission of a PUCCH, and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern is selected from multiple hopping patterns, and whether the repetition of the PUCCH in each of the $N^{repeat}_{PUCCH}$ slots is allocated at least in the first PRB or at least in the second PRB is determined based on the one hopping pattern. The one hopping pattern may be selected from the multiple hopping patterns based at least on a first number of slots and a second number of slots, the first number of slots may be a number of continuous slots among slots associated with the first PRB, and the second number of slots may be a number of continuous slots among slots associated with the second PRB.

(6) A sixth aspect of the present invention is a terminal apparatus including a receiver configured to receive a PDCCH including a DCI format indicating transmission of a PUCCH and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB; in a case that an n-th slot for repetition of the PUCCH is continuous with an n+1-th slot for repetition of the PUCCH, the repetition of the PUCCH in the n+1-th slot does not perform frequency hopping; in a case that the n-th slot for repetition of the PUCCH is not continuous with the n+1-th slot for repetition of the PUCCH, the repetition of the PUCCH in the n+1-th slot performs frequency hopping; in a case that the repetition of the PUCCH in the n-th slot is allocated at least in the first PRB, the repetition of the PUCCH in the n+1-th slot performing frequency hopping is allocating, at least in the second PRB, the repetition of the PUCCH in the n+1-th slot; in a case that the repetition of the PUCCH in the n-th slot is allocated at least in the second PRB, the repetition of the PUCCH in the n+1-th slot performing frequency hopping is allocating, at least in the first PRB, the repetition of the PUCCH in the n+1-th slot; in a case that the repetition of the PUCCH in the n-th slot is allocated at least in the first PRB, the repetition of the PUCCH in the n+1-th slot not performing frequency hopping is allocating, at least in the first PRB, the repetition of the PUCCH in the n+1-th slot; in a case that the repetition of the PUCCH in the n-th slot is allocated at least in the second PRB, the repetition of the PUCCH in the n+1-th slot not performing frequency hopping is allocating, at least in the second PRB, the repetition of the PUCCH in the n+1-th slot, and the n is an integer from 1 to the $N^{repeat}_{PUCCH}$.

(7) A seventh aspect of the present invention is a base station apparatus including a transmitter configured to transmit a PDCCH including a DCI format indicating transmission of a PUCCH, and a receiver configured to receive the PUCCH, wherein a number of slots $N^{repeat}_{PUCCH}$ is configured by a higher-layer parameter NrofSlots, the PUCCH is repeated in the $N^{repeat}_{PUCCH}$ slots, a first PRB is configured by a higher-layer parameter StartingPRB, a second PRB is configured by a higher-layer parameter SecondHopPRB, one hopping pattern from multiple hopping patterns is determined based on the DCI format, and whether repetition of the PUCCH in each of the $N^{repeat}_{PUCCH}$ slots is allocated at least in the first PRB or at least in the second PRB is determined based on the one hopping pattern.

(8) An eighth aspect of the present invention is a base station apparatus including a transmitter configured to transmit a PDCCH including a DCI format indicating transmission of a PUCCH, and a receiver configured to receive the PUCCH, wherein a number of slots $N^{repeat}_{PUCCH}$ is configured by a higher-layer parameter NrofSlots, the PUCCH is repeated in the $N^{repeat}_{PUCCH}$ slots, a first PRB is configured by a higher-layer parameter StartingPRB, a second PRB is configured by a higher-layer parameter SecondHopPRB, one hopping pattern from multiple hopping patterns is determined based on a PUCCH resource corresponding to the PUCCH, and whether repetition of the PUCCH in each of the $N^{repeat}_{PUCCH}$ slots is allocated at least in the first PRB or at least in the second PRB is determined based on the one hopping pattern.

(9) A ninth aspect of the present invention is a base station apparatus including a transmitter configured to transmit a PDCCH including a DCI format indicating transmission of a PUCCH, and a receiver configured to receive the PUCCH, wherein a number of slots $N^{repeat}_{PUCCH}$ is configured by a higher-layer parameter NrofSlots, the PUCCH is repeated in the $N^{repeat}_{PUCCH}$ slots, a first PRB is configured by a higher-layer parameter StartingPRB, a second PRB is configured by a higher-layer parameter SecondHopPRB, an index of one hopping pattern is determined based on the DCI format, one hopping pattern is determined from multiple hopping patterns based at least on the index of the one hopping pattern, and whether repetition of the PUCCH in each of the $N^{repeat}_{PUCCH}$ slots is allocated at least in the first PRB or at least in the second PRB is determined based on the one hopping pattern.

(10) A tenth aspect of the present invention is a base station apparatus including a transmitter configured to transmit a PDCCH including a DCI format indicating transmission of a PUCCH, and a receiver configured to receive the PUCCH, wherein a number of slots $N^{repeat}_{PUCCH}$ is configured by a higher-layer parameter NrofSlots, the PUCCH is repeated in the $N^{repeat}_{PUCCH}$ slots, a first PRB is configured by a higher-layer parameter StartingPRB, a second PRB is configured by a higher-layer parameter SecondHopPRB, an index of one hopping pattern is determined based on a PUCCH resource corresponding to the PUCCH, one hopping pattern from multiple hopping patterns is determined based at least on the index of the one hopping pattern, and whether repetition of the PUCCH in each of the $N^{repeat}_{PUCCH}$ slots is allocated at least in the first PRB or at least in the second PRB is determined based on the one hopping pattern.

The seventh aspect and the eighth aspect of the present invention is the base station apparatus in which, the one hopping pattern may include the $N^{repeat}_{PUCCH}$ bits, and in a case that a value of a n-th bit of the one hopping pattern is 0, the repetition of the PUCCH in the n-th slot may be allocated at least in the first PRB, and in a case that the value of the n-th bit of the one hopping pattern is 1, the repetition of the PUCCH in the n-th slot may be allocated at least in the second PRB, and the n may be an integer from 1 to the $N^{repeat}_{PUCCH}$.

The seventh aspect and the eighth aspect of the present invention is the base station apparatus in which, the $N^{repeat}_{PUCCH}$ slots may be configured with $N'^{repeat}_{PUCCH}$ slot sets, each of the $N'^{repeat}_{PUCCH}$ slot sets may include one or multiple continuous slots, the one hopping pattern may include the $N'^{repeat}_{PUCCH}$ bits, in a case that a value of an n-th bit of the one hopping pattern is 0, the repetition of the PUCCH in the n-th slot set may be allocated at least in the first PRB, in a case that a value of the n-th bit of the one hopping pattern is 1, the repetition of the PUCCH in the n-th slot set may be allocated at least in the second PRB, and the n may be an integer from 1 to the $N'^{repeat}_{PUCCH}$.

The seventh aspect and the eighth aspect of the present invention is the base station apparatus in which, the one hopping pattern may include the $N^{repeat}_{PUCCH}-1$ bits; in a case that a value of an n-th bit of the one hopping pattern is 0, the repetition of the PUCCH in an n+1-th slot may not perform frequency hopping; in a case that the value of the n-th bit of the one hopping pattern is 1, the repetition of the PUCCH in the n+1-th slot may perform frequency hopping; in a case that the repetition of the PUCCH in the n-th slot is allocated at least in the first PRB, the repetition of the PUCCH in the n+1-th slot performing frequency hopping may be allocating, at least in the second PRB, the repetition of the PUCCH in the n+1-th slot; in a case that the repetition of the PUCCH in the n-th slot is allocated at least in the second PRB, the repetition of the PUCCH in the n+1-th slot performing frequency hopping may be allocating, at least in the first PRB, the repetition of the PUCCH in the n+1-th slot, in a case that the repetition of the PUCCH in the n-th slot is allocated at least in the first PRB, the repetition of the PUCCH in the n+1-th slot not performing frequency hopping may be allocating, at least in the first PRB, the repetition of the PUCCH in the n+1-th slot; in a case that the repetition of the PUCCH in the n-th slot is allocated at least in the second PRB, the repetition of the PUCCH in the n+1-th slot not performing frequency hopping may be allocating, at least in the second PRB, the repetition of the PUCCH in the n+1-th slot, and the n may be an integer from 1 to the $N^{repeat}_{PUCCH}-1$.

The seventh aspect and the eighth aspect of the present invention is the base station apparatus in which, the $N^{repeat}_{PUCCH}$ slots may be configured with $N'^{repeat}_{PUCCH}$ slot sets, and each of the $N'^{repeat}_{PUCCH}$ slot sets may include one or multiple continuous slots, the one hopping pattern may include the $N'^{repeat}_{PUCCH}-1$ bits; in a case that a value of an n-th bit of the one hopping pattern is 0, the repetition of the PUCCH in an n+1-th slot set may not perform frequency hopping; in a case that the value of the n-th bit of the one hopping pattern is 1, the repetition of the PUCCH in the n+1-th slot set may perform frequency hopping; in a case that the repetition of the PUCCH in the n-th slot set is allocated at least in the first PRB, the repetition of the PUCCH in the n+1-th slot set performing frequency hopping may be allocating, at least in the second PRB, the repetition of the PUCCH in the n+1-th slot set; in a case that the repetition of the PUCCH in the n-th slot set is allocated at least in the second PRB, the repetition of the PUCCH in the n+1-th slot set performing frequency hopping may be allocating, at least in the first PRB, the repetition of the PUCCH in the n+1-th slot set; in a case that the repetition of the PUCCH in the n-th slot set is allocated at least in the first PRB, the repetition of the PUCCH in the n+1-th slot set not performing frequency hopping may be allocating, at least in the first PRB, the repetition of the PUCCH in the n+1-th slot set; in a case that the repetition of the PUCCH in the n-th slot set is allocated at least in the second PRB, the repetition of the PUCCH in the n+1-th slot set not performing frequency hopping may be allocating, at least in the second PRB, the repetition of the PUCCH in the n+1-th slot set, and the n may be an integer from 1 to the $N^{repeat}_{PUCCH}-1$.

(11) An eleventh aspect of the present invention is a base station apparatus including a transmitter configured to transmit a PDCCH including a DCI format indicating transmission of a PUCCH, and a receiver configured to receive the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern is selected from multiple hopping patterns, and whether repetition of the PUCCH in each of the $N^{repeat}_{PUCCH}$ slots is allocated at least in the first PRB or at least in the second PRB is determined based on the one hopping pattern. The one hopping pattern may be selected from the multiple hopping patterns based at least on a first number of slots and a second number of slots, the first number of slots may be a number of continuous slots among slots associated with the first PRB, and the second number of slots may be a number of continuous slots among slots associated with the second PRB.

(12) A twelfth aspect of the present invention is a base station apparatus including a transmitter configured to transmit a PDCCH including a DCI format indicating transmission of a PUCCH and a receiver configured to receive the PUCCH, wherein a number of slots $N^{repeat}_{PUCCH}$ is configured by a higher layer parameter NrofSlots, and the PUCCH is configured in the $N^{repeat}_{PUCCH}$ slots, a first PRB is configured by a higher layer parameter StartingPRB, a second PRB is configured by a higher layer parameter SecondHopPRB; in a case that an n-th slot for repetition of the PUCCH is continuous with an n+1-th slot for repetition of the PUCCH, the repetition of the PUCCH in the n+1-th slot does not perform frequency hopping, in a case that the n-th slot for repetition of the PUCCH is not continuous with the n+1-th slot for repetition of the PUCCH, the repetition of the PUCCH in the n+1-th slot performs frequency hopping; in a case that the repetition of the PUCCH in the n-th slot is allocated at least in the first PRB, the repetition of the PUCCH in the n+1-th slot performing frequency hopping is allocating, at least in the second PRB, the repetition of the PUCCH in the n+1-th slot; in a case that the repetition of the PUCCH in the n-th slot is allocated at least in the second PRB, the repetition of the PUCCH in the n+1-th slot performing frequency hopping is allocating, at least in the first PRB, the repetition of the PUCCH in the n+1-th slot; in a case that the repetition of the PUCCH in the n-th slot is allocated at least in the first PRB, the repetition of the PUCCH in the n+1-th slot not performing frequency hopping is allocating, at least in the first PRB, the repetition of the PUCCH in the n+1-th slot; in a case that the repetition of the PUCCH in the n-th slot is allocated at least in the second PRB, the repetition of the PUCCH in the n+1-th slot not performing frequency hopping is allocating, at least in the second PRB, the repetition of the PUCCH in the n+1-th slot, and the n is an integer from 1 to the $N^{repeat}_{PUCCH}$.

(13) A thirteenth aspect of the present invention is a terminal apparatus including a receiver configured to receive a PDCCH including a DCI format indicating transmission of a PUCCH and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern of multiple hopping patterns is used for repetition of the PUCCH, whether repetition of the PUCCH in each of the $N^{repeat}_{PUCCH}$ slots is allocated at least in the first PRB or at least in the second PRB is determined based on the one hopping pattern, the multiple hopping patterns include some or all of $N^{repeat}_{PUCCH}/2$ hopping patterns; in each of the $N^{repeat}_{PUCCH}/2$ hopping patterns, slots from an n-th slot to an n+$N^{repeat}_{PUCCH}/2$-th slot for repetition of the PUCCH correspond to a hopping pattern associated with the second PRB; in each of the $N^{repeat}_{PUCCH}/2$ hopping patterns, the slots other than the slots from the n-th slot to the n+$N^{repeat}_{PUCCH}/2$-th slot of the $N^{repeat}_{PUCCH}$ slots correspond to a hopping pattern associated with the first PRB; and the n is an integer from 2 to $N^{repeat}_{PUCCH}/2$. The $N^{repeat}_{PUCCH}$ may be 8, and in the $N^{repeat}_{PUCCH}/2$ hopping patterns, the first of the $N^{repeat}_{PUCCH}$ slots may be associated with the first PRB, the second of the $N^{repeat}_{PUCCH}$ slots may be associated with the first PRB, the third of the $N^{repeat}_{PUCCH}$ slots may be associated with the first PRB, the fourth of the $N^{repeat}_{PUCCH}$ slots may be associated with the first PRB, the fifth of the $N^{repeat}_{PUCCH}$ slots may be associated with the second PRB, the sixth of the $N^{repeat}_{PUCCH}$ slots may be associated with the second PRB, the seventh of the $N^{repeat}_{PUCCH}$ slots may be associated with the second PRB, the eighth of the $N^{repeat}_{PUCCH}$ slots may include a hopping pattern associated with the second PRB, and in the $N^{repeat}_{PUCCH}/2$ hopping patterns, the first of the $N^{repeat}_{PUCCH}$ slots may be associated with the first PRB, the second of the $N^{repeat}_{PUCCH}$ slots may be associated with the first PRB, the third of the $N^{repeat}_{PUCCH}$ slots may be associated with the first PRB, the fourth of the $N^{repeat}_{PUCCH}$ slots may be associated with the second PRB, the fifth of the $N^{repeat}_{PUCCH}$ slots may be associated with the second PRB, the sixth of the $N^{repeat}_{PUCCH}$ slots may be associated with the second PRB, the seventh of the $N^{repeat}_{PUCCH}$ slots may be associated with the second PRB, the eighth of the $N^{repeat}_{PUCCH}$ slots may include a hopping pattern associated with the first PRB, and in the $N^{repeat}_{PUCCH}/2$ hopping patterns, the first of the $N^{repeat}_{PUCCH}$ slots may be associated with the first PRB, the second of the $N^{repeat}_{PUCCH}$ slots may be associated with the first PRB, the third of the $N^{repeat}_{PUCCH}$ slots may be associated with the second PRB, the fourth of the $N^{repeat}_{PUCCH}$ slots may be associated with the second PRB, the fifth of the $N^{repeat}_{PUCCH}$ slots may be associated with the second PRB, the sixth of the $N^{repeat}_{PUCCH}$ slots may be associated with the second PRB, the seventh of the $N^{repeat}_{PUCCH}$ slots may be associated with the first PRB, the eighth of the $N^{repeat}_{PUCCH}$ slots may include a hopping pattern associated with the first PRB, and in the $N^{repeat}_{PUCCH}/2$ hopping patterns, the first of the $N^{repeat}_{PUCCH}$ slots may be associated with the first PRB, the second of the $N^{repeat}_{PUCCH}$ slots may be associated with the second PRB, the third of the $N^{repeat}_{PUCCH}$ slots may be associated with the second PRB, the fourth of the $N^{repeat}_{PUCCH}$ slots may be associated with the second PRB, the fifth of the $N^{repeat}_{PUCCH}$ slots may be associated with the second PRB, the sixth of the $N^{repeat}_{PUCCH}$ slots may be associated with the first PRB, the seventh of the $N^{repeat}_{PUCCH}$ slots may be associated with the first PRB, and the eighth of the $N^{repeat}_{PUCCH}$ slots may include a hopping pattern associated with the first PRB.

(14) A fourteenth aspect of the present invention is a terminal apparatus including a receiver configured to receive a PDCCH including a DCI format indicating transmission of a $N^{repeat}_{PUCCH}$ and a transmitter configured to transmit the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern of multiple hopping patterns is used for repetition of the PUCCH, whether repetition of the PUCCH in each of the $N^{repeat}_{PUCCH}$ slots is allocated at least in the first PRB or at least in the second PRB is determined based on the one hopping pattern, the multiple hopping patterns include some or all of $N^{repeat}_{PUCCH}/2-1$ hopping patterns, each of the $N^{repeat}_{PUCCH}/2-1$ hopping patterns is a hopping pattern in which a first repetition of the PUCCH is allocated at least in the first PRB, and each of the $N^{repeat}_{PUCCH}/2-1$ hopping patterns is a hopping pattern in which a slot with the repetition of the PUCCH allocated at least in the first PRB is not continuous with a slot with the repetition of the PUCCH allocated at least in the second PRB. The $N^{repeat}_{PUCCH}$ may be 8, the $N^{repeat}_{PUCCH}$ slots includes $N'^{repeat}_{PUCCH}$ slot sets, each of the $N'^{repeat}_{PUCCH}$ slot sets may be configured with one or multiple continuous slots, and in the $N^{repeat}_{PUCCH}/2-1$ hopping patterns, the first of the $N'^{repeat}_{PUCCH}$ slot sets may be associated with the first PRB, the second of the $N'^{repeat}_{PUCCH}$ slot sets may include a hopping pattern associated with the second PRB, and in the $N'^{repeat}_{PUCCH}/2-1$ hopping patterns, the first of the $N'^{repeat}_{PUCCH}$ slot sets may be associated with the first PRB, the second of the $N'^{repeat}_{PUCCH}$ slot sets may be associated with the first PRB, the third of the $N'^{repeat}_{PUCCH}$ slot sets may be associated with the second PRB, the fourth of the $N'^{repeat}_{PUCCH}$ slot sets may include a hopping pattern associated with the second PRB, and in the $N'^{repeat}_{PUCCH}/2-1$ hopping patterns, the first of the $N'^{repeat}_{PUCCH}$ slot sets may be associated with the first PRB, the second of the $N'^{repeat}_{PUCCH}$ slot sets may be associated with the first PRB, the third of the $N'^{repeat}_{PUCCH}$ slot sets may be associated with the first PRB, the fourth of the $N'^{repeat}_{PUCCH}$ slot sets may be associated with the second PRB, the fifth of the $N'^{repeat}_{PUCCH}$ slot sets may be associated with the second PRB, and the sixth of the $N'^{repeat}_{PUCCH}$ slots sets may include a hopping pattern associated with the second PRB.

(15) A fifteenth aspect of the present invention is a base station apparatus including a transmitter configured to transmit a PDCCH including a DCI format indicating transmission of a PUCCH and a receiver configured to receive the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern of multiple hopping patterns is used for repetition of the PUCCH, whether repetition of the PUCCH in each of the $N^{repeat}_{PUCCH}$ slots is allocated at least in the first PRB or at least in the second PRB is determined based on the one hopping pattern, the multiple hopping patterns include some or all of $N^{repeat}_{PUCCH}/2$ hopping patterns, and in each of the $N^{repeat}_{PUCCH}/2$ hopping patterns, slots from an n-th slot to an n+$N^{repeat}_{PUCCH}/2$-th slot for repetition of the PUCCH correspond to a hopping pattern associated with the second PRB, and in each of the $N^{repeat}_{PUCCH}/2$ hopping patterns, the slots other than the slots from the n-th slot to the n+$N^{repeat}_{PUCCH}/2$-th slot of the $N^{repeat}_{PUCCH}$ slots correspond to a hopping pattern associated with the first PRB, and the n is an integer from 2 to $N^{repeat}_{PUCCH}/2$. The $N^{repeat}_{PUCCH}$ may be 8, and in the $N^{repeat}_{PUCCH}/2$ hopping patterns, the first of the $N^{repeat}_{PUCCH}$ slots may be associated with the first PRB, the second of the $N^{repeat}_{PUCCH}$ slots may be associated with the first PRB, the third of the $N^{repeat}_{PUCCH}$ slots may be associated with the first PRB, the fourth of the $N^{repeat}_{PUCCH}$ slots may be associated with the first PRB, the fifth of the $N^{repeat}_{PUCCH}$ slots may be associated with the second PRB, the sixth of the $N^{repeat}_{PUCCH}$ slots may be associated with the second PRB, the seventh of the $N^{repeat}_{PUCCH}$ slots may be associated with the second PRB, the eighth of the $N^{repeat}_{PUCCH}$ slots may include a hopping pattern associated with the second PRB, and in the $N^{repeat}_{PUCCH}/2$ hopping patterns, the first of the $N^{repeat}_{PUCCH}$ slots may be associated with the first PRB, the second of the $N^{repeat}_{PUCCH}$ slots may be associated with the first PRB, the third of the $N^{repeat}_{PUCCH}$ slots may be associated with the first PRB, the fourth of the $N^{repeat}_{PUCCH}$ slots may be associated with the second PRB, the fifth of the $N^{repeat}_{PUCCH}$ slots may be associated with the second PRB, the sixth of the $N^{repeat}_{PUCCH}$ slots may be associated with the second PRB, the seventh of the $N^{repeat}_{PUCCH}$ slots may be associated with the second PRB, the eighth of the $N^{repeat}_{PUCCH}$ slots may include a hopping pattern associated with the first PRB, and in the $N^{repeat}_{PUCCH}/2$ hopping patterns, the first of the $N^{repeat}_{PUCCH}$ slots may be associated with the first PRB, the second of the $N^{repeat}_{PUCCH}$ slots may be associated with the first PRB, the third of the $N^{repeat}_{PUCCH}$ slots may be associated with the second PRB, the fourth of the $N^{repeat}_{PUCCH}$ slots may be associated with the second PRB, the fifth of the $N^{repeat}_{PUCCH}$ slots may be associated with the second PRB, the sixth of the $N^{repeat}_{PUCCH}$ slots may be associated with the second PRB, the seventh of the $N^{repeat}_{PUCCH}$ slots may be associated with the first PRB, the eighth of the $N^{repeat}_{PUCCH}$ slots may include a hopping pattern associated with the first PRB, and in the $N^{repeat}_{PUCCH}/2$ hopping patterns, the first of the $N^{repeat}_{PUCCH}$ slots may be associated with the first PRB, the second of the $N^{repeat}_{PUCCH}$ slots may be associated with the second PRB, the third of the $N^{repeat}_{PUCCH}$ slots may be associated with the second PRB, the fourth of the $N^{repeat}_{PUCCH}$ slots may be associated with the second PRB, the fifth of the $N^{repeat}_{PUCCH}$ slots may be associated with the second PRB, the sixth of the $N^{repeat}_{PUCCH}$ slots may be associated with the first PRB, the seventh of the $N^{repeat}_{PUCCH}$ slots may be associated with the first PRB, and the eighth of the $N^{repeat}_{PUCCH}$ slots may include a hopping pattern associated with the first PRB.

(16) A sixteenth aspect of the present invention is a base station apparatus including a transmitter configured to transmit a PDCCH including a DCI format indicating transmission of a PUCCH and a receiver configured to receive the PUCCH, wherein a number of slots $N^{repeat}_{PUCCH}$ is configured by a higher layer parameter NrofSlots, the PUCCH is repeated in the $N^{repeat}_{PUCCH}$ slots, a first PRB is configured by a higher layer parameter StartingPRB, a second PRB is configured by a higher layer parameter SecondHopPRB, one hopping pattern of multiple hopping patterns is used for repetition of the PUCCH, whether repetition of the PUCCH in each of the $N^{repeat}_{PUCCH}$ slots is allocated at least in the first PRB or at least in the second PRB is determined based on the one hopping pattern, the multiple hopping patterns include some or all of $N^{repeat}_{PUCCH}/2-1$ hopping patterns, each of the $N^{repeat}_{PUCCH}/2-1$ hopping patterns is a hopping pattern in which first repetition of the PUCCH is allocated at least in the first PRB, and each of the $N^{repeat}_{PUCCH}/2-1$ hopping patterns is a hopping pattern in which a slot with the repetition of the PUCCH allocated at least in the first PRB is not continuous with a slot with the repetition of the PUCCH allocated at least in the second PRB. The $N^{repeat}_{PUCCH}$ may be 8, the $N^{repeat}_{PUCCH}$ slots includes $N^{repeat}_{PUCCH}$ slot sets, each of the $N^{repeat}_{PUCCH}$ slot sets may be configured with one or multiple continuous slots, and in the $N^{repeat}_{PUCCH}/2-1$ hopping patterns, the first of the $N^{repeat}_{PUCCH}$ slot sets may be associated with the first PRB, the second of the $N^{repeat}_{PUCCH}$ slot sets may include a hopping pattern associated with the second PRB, and in the $N'^{repeat}_{PUCCH}/2-1$ hopping patterns, the first of the $N'^{repeat}_{PUCCH}$ sets may be associated with the first PRB, the second of the $N'^{repeat}_{PUCCH}$ slot sets may be associated with the first PRB, the third of the $N'^{repeat}_{PUCCH}$ slot sets may be associated with the second PRB, the fourth of the $N'^{repeat}_{PUCCH}$ slot sets may include a hopping pattern associated with the second PRB, and in the $N'^{repeat}_{PUCCH}/2-1$ hopping patterns, the first of the $N'^{repeat}_{PUCCH}$ slot sets may be associated with the first PRB, the second of the $N'^{repeat}_{PUCCH}$ slot sets may be associated with the first PRB, the third of the $N'^{repeat}_{PUCCH}$ slot sets may be associated with the first PRB, the fourth of the $N'^{repeat}_{PUCCH}$ slot sets may be associated with the second PRB, the fifth of the $N'^{repeat}_{PUCCH}$ slot sets may be associated with the second PRB, and the sixth of the $N'^{repeat}_{PUCCH}$ slots sets may include a hopping pattern associated with the second PRB.

Each program running on a base station apparatus 3 and a terminal apparatus 1 according to the present invention may be a program that controls a Central Processing Unit (CPU) and the like, such that the program causes a computer to operate in such a manner as to realize the functions of the above-described embodiment according to the present invention. The information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially implemented by a computer. In that case, this configuration may be implemented by recording a program for implementing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as peripheral devices. A "computer-readable recording medium" refers to a portable medium such as a flexible disk, a magneto-optical disk, a ROM, and a CD-ROM, and a storage apparatus such as a hard disk built into the computer system.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

Furthermore, the base station apparatus 3 according to the aforementioned embodiment may be implemented as an aggregation (apparatus group) including multiple apparatuses. Each of the apparatuses included in such an apparatus group may include a part or all of each function or each functional block of the base station apparatus 3 according to the aforementioned embodiment. As the apparatus group, it is only necessary to have all of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have a part or all of the functions of a higher node for an eNodeB and/or a gNB.

Also, a part or all portions of each of the terminal apparatus 1 and the base station apparatus 3 according to the aforementioned embodiment may be implemented as an LSI, which is typically an integrated circuit, or may be implemented as a chip set. The functional blocks of each of the terminal apparatus 1 and the base station apparatus 3 may be individually implemented as a chip, or a part or all of the functional blocks may be integrated into a chip. Furthermore, a circuit integration technique is not limited to the LSI and may be implemented with a dedicated circuit or a general-purpose processor. Moreover, in a case that a circuit integration technology that substitutes an LSI appears with the advance of the semiconductor technology, it is also possible to use an integrated circuit based on the technology.

In addition, although the aforementioned embodiments have described the terminal apparatus as an example of a communication apparatus, the present invention is not limited to such a terminal apparatus, and is also applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. A configuration in which elements described in the respective embodiments and having mutually the similar effects, are substituted for one another is also included.

INDUSTRIAL APPLICABILITY

The present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception circuitry
10a, 30a Radio transmission circuitry
10b, 30b Radio reception circuitry
11,31 Antenna circuitry
12, 32 RF circuitry
13, 33 Baseband circuitry
14, 34 Higher layer processing circuitry
15, 35 Medium access control layer processing circuitry
16, 36 Radio resource control layer processing circuitry
91, 92, 93, 94 Search space set
300 Component carrier
301 Primary cell
302, 303 Secondary cell
3000 Point
3001, 3002 Resource grid
3003, 3004 BWP
3011, 3012, 3013, 3014 Offset
3100, 3200 Common resource block set
900 Downlink carrier
901 Uplink carrier
910 PDCCH
920, 921, 922, 923 PUCCH
930, 931, 932, 933, 934 Slot

The invention claimed is:

1. A terminal apparatus comprising:
a transmitter configured to transmit a Physical Uplink Control CHannel (PUCCH) in a first slot set and a second slot set; and
a receiver configured to receive a Physical Downlink Control CHannel (PDCCH) including a Downlink Control Information (DCI) format, wherein
a first Physical Resource Block (PRB) is provided by a first higher layer parameter,
a second PRB is provided by a second higher layer parameter,
each of the first slot set and the second slot set includes multiple consecutive slots,
the first slot set is associated with the first PRB,
the second slot set is associated with the second PRB,
a number of slots N is indicated by the DCI format,
the PUCCH is repeated in the N slots,
the N slots are configured with the first slot set and the second slot set, and
at least one of the first slot set and the second slot set includes a downlink slot.

2. A base station apparatus comprising:
a receiver configured to receive a Physical Uplink Control CHannel (PUCCH) in a first slot set and a second slot set; and
a transmitter configured to transmit a Physical Downlink Control CHannel (PDCCH) including a Downlink Control Information (DCI) format, wherein
a first Physical Resource Block (PRB) is provided by a first higher layer parameter,
a second PRB is provided by a second higher layer parameter,
each of the first slot set and the second slot set includes multiple consecutive slots,
the first slot set is associated with the first PRB,
the second slot set is associated with the second PRB,
a number of slots N is indicated by the DCI format,
the PUCCH is repeated in the N slots,
the N slots are configured with the first slot set and the second slot set, and
at least one of the first slot set and the second slot set includes a downlink slot.

3. A communication method used in a terminal apparatus, the communication method comprising:
transmitting a Physical Uplink Control CHannel (PUCCH) in a first slot set and a second slot set; and
receiving a Physical Downlink Control CHannel (PDCCH) including a Downlink Control Information (DCI) format, wherein
a first Physical Resource Block (PRB) is provided by a first higher layer parameter,
a second PRB is provided by a second higher layer parameter,
each of the first slot set and the second slot set includes multiple consecutive slots,
the first slot set is associated with the first PRB,
the second slot set is associated with the second PRB,
a number of slots N is indicated by the DCI format,
the PUCCH is repeated in the N slots,
the N slots are configured with the first slot set and the second slot set, and
at least one of the first slot set and the second slot set includes a downlink slot.

* * * * *